United States Patent
Kobori

(10) Patent No.: US 11,829,548 B2
(45) Date of Patent: Nov. 28, 2023

(54) POSITION DETECTION SENSOR AND ELECTRONIC DEVICE

(71) Applicant: Wacom Co., Ltd., Saitama (JP)

(72) Inventor: Takeshi Kobori, Saitama (JP)

(73) Assignee: Wacom Co., Ltd., Saitama (JP)

( * ) Notice: Subject to any disclaimer, the term of this patent is extended or adjusted under 35 U.S.C. 154(b) by 51 days.

(21) Appl. No.: 17/499,789

(22) Filed: Oct. 12, 2021

(65) Prior Publication Data
US 2022/0035501 A1 Feb. 3, 2022

Related U.S. Application Data

(63) Continuation of application No. PCT/JP2020/020889, filed on May 27, 2020.

(30) Foreign Application Priority Data

Jul. 5, 2019 (JP) .................... 2019-126223

(51) Int. Cl.
- *G06F 3/041* (2006.01)
- *G06F 3/044* (2006.01)
- *G06F 3/0354* (2013.01)

(52) U.S. Cl.
CPC ...... *G06F 3/04162* (2019.05); *G06F 3/03545* (2013.01); *G06F 3/0441* (2019.05);
(Continued)

(58) Field of Classification Search
CPC .............. G06F 3/04162; G06F 3/03545; G06F 3/0441; G06F 3/0446; G06F 3/0447;
(Continued)

(56) References Cited

U.S. PATENT DOCUMENTS

2003/0025679 A1 2/2003 Taylor et al.
2011/0298737 A1 12/2011 Maeda et al.
(Continued)

FOREIGN PATENT DOCUMENTS

JP 2011-257831 A 12/2011
JP 2015-38714 A 2/2015
(Continued)

OTHER PUBLICATIONS

International Search Report dated Aug. 11, 2020, for the corresponding International Patent Application No. PCT/JP2020/020889, 2 pages.
(Continued)

*Primary Examiner* — Amit Chatly
(74) *Attorney, Agent, or Firm* — Seed IP Law Group LLP

(57) ABSTRACT

A position detection sensor allows for providing, on a back side of the position detection sensor, a component that needs to be accessed from a front side thereof. The position detection sensor includes a plurality of position detection electrodes arranged on an insulating substrate, wherein a region provided with the plurality of position detection electrodes forms an effective detection region for detecting an indicated position of a position indicator. A through hole in a predetermined shape is formed in the insulating substrate in the effective detection region. The position detection electrodes are arranged to bypass the through hole along the shape of the through hole at an area intersecting the through hole.

17 Claims, 9 Drawing Sheets

(52) U.S. Cl.
CPC .......... *G06F 3/0446* (2019.05); *G06F 3/0447* (2019.05); *G06F 3/0448* (2019.05)

(58) Field of Classification Search
CPC ...... G06F 3/0448; G06F 3/0383; G06F 3/046; G06F 3/04164
See application file for complete search history.

(56) References Cited

U.S. PATENT DOCUMENTS

| | | | |
|---|---|---|---|
| 2015/0331526 A1* | 11/2015 | Hashida | G06F 3/0445 345/174 |
| 2015/0355768 A1 | 12/2015 | Kuwahara et al. | |
| 2016/0048247 A1 | 2/2016 | Han et al. | |
| 2017/0177123 A1* | 6/2017 | Kobori | G06F 3/03545 |
| 2018/0196575 A1* | 7/2018 | Yarosh | G06F 3/045 |
| 2020/0064968 A1* | 2/2020 | Kim | G06F 3/0445 |
| 2020/0167028 A1* | 5/2020 | Morrison | G06F 3/0448 |

FOREIGN PATENT DOCUMENTS

| | | |
|---|---|---|
| JP | 2015-231444 A | 12/2015 |
| WO | 2014/115831 A1 | 7/2014 |
| WO | 2016/056272 A1 | 4/2016 |
| WO | 2018/206948 A2 | 11/2018 |

OTHER PUBLICATIONS

Extended European Search Report, dated May 13, 2022, for European Application No. 20837914.9-1224, 8 pages.

* cited by examiner

FIG. 2
1 ELECTRONIC DEVICE
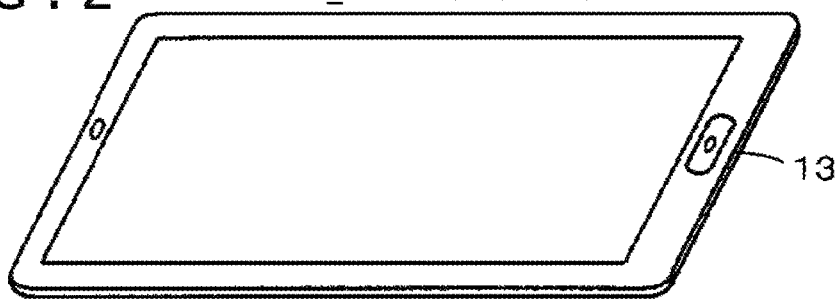
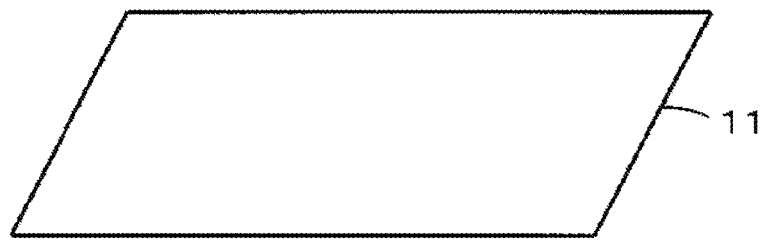
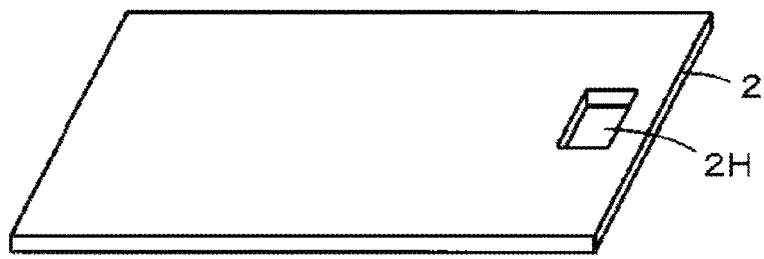
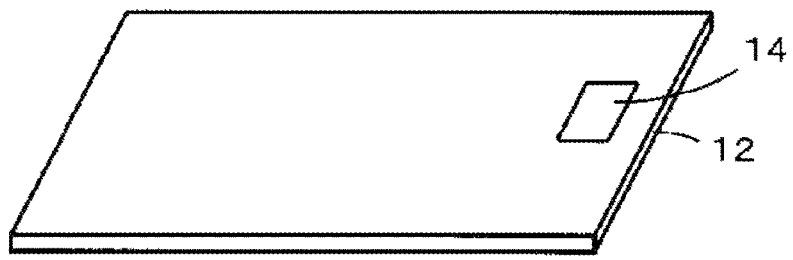
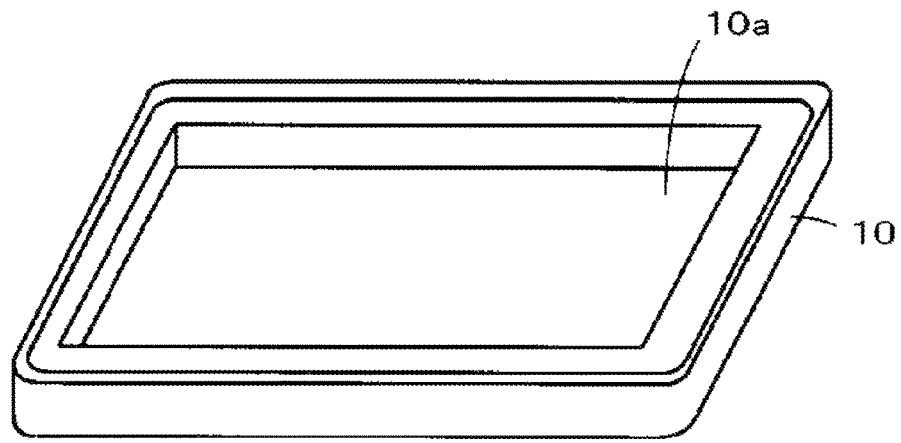

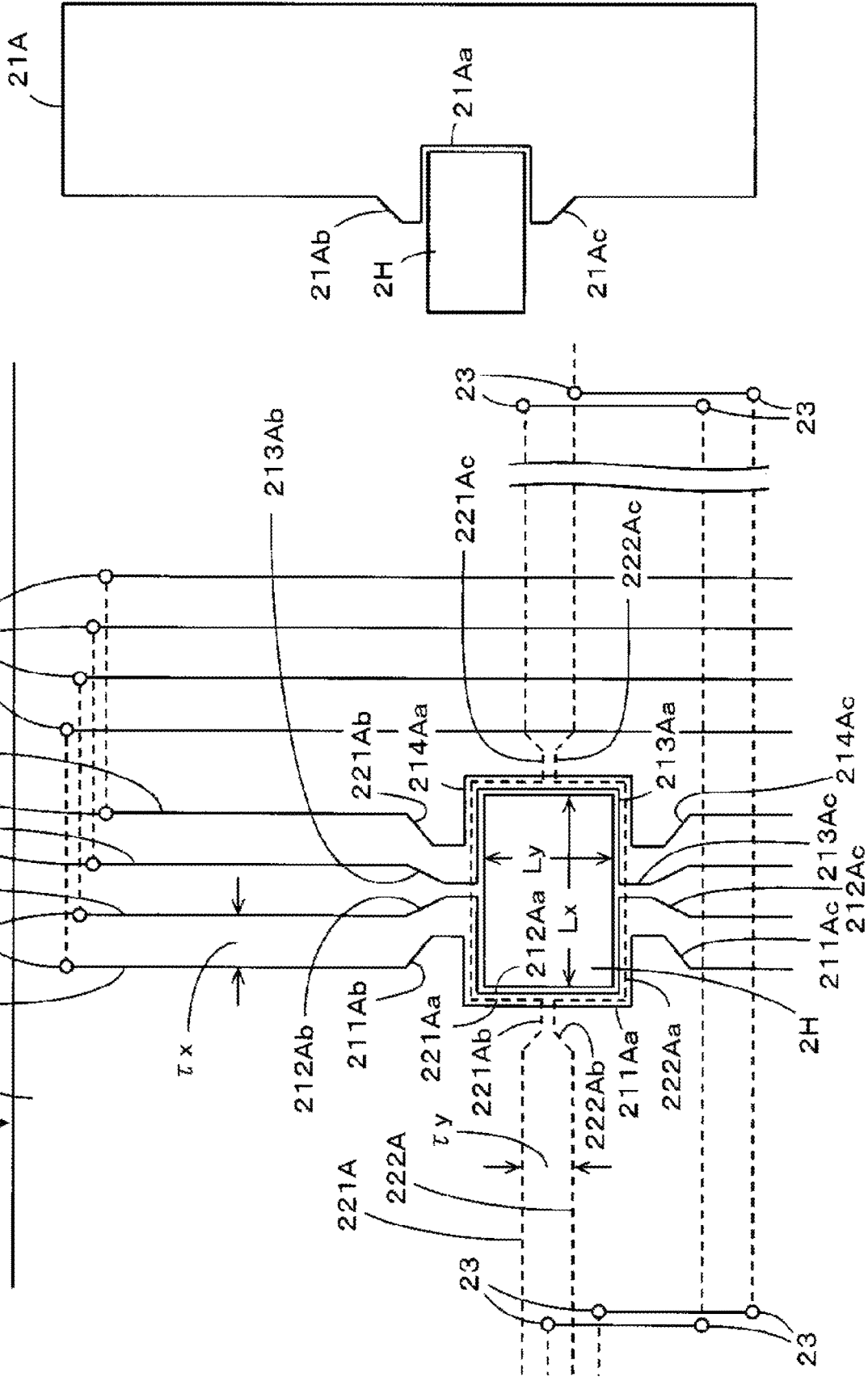

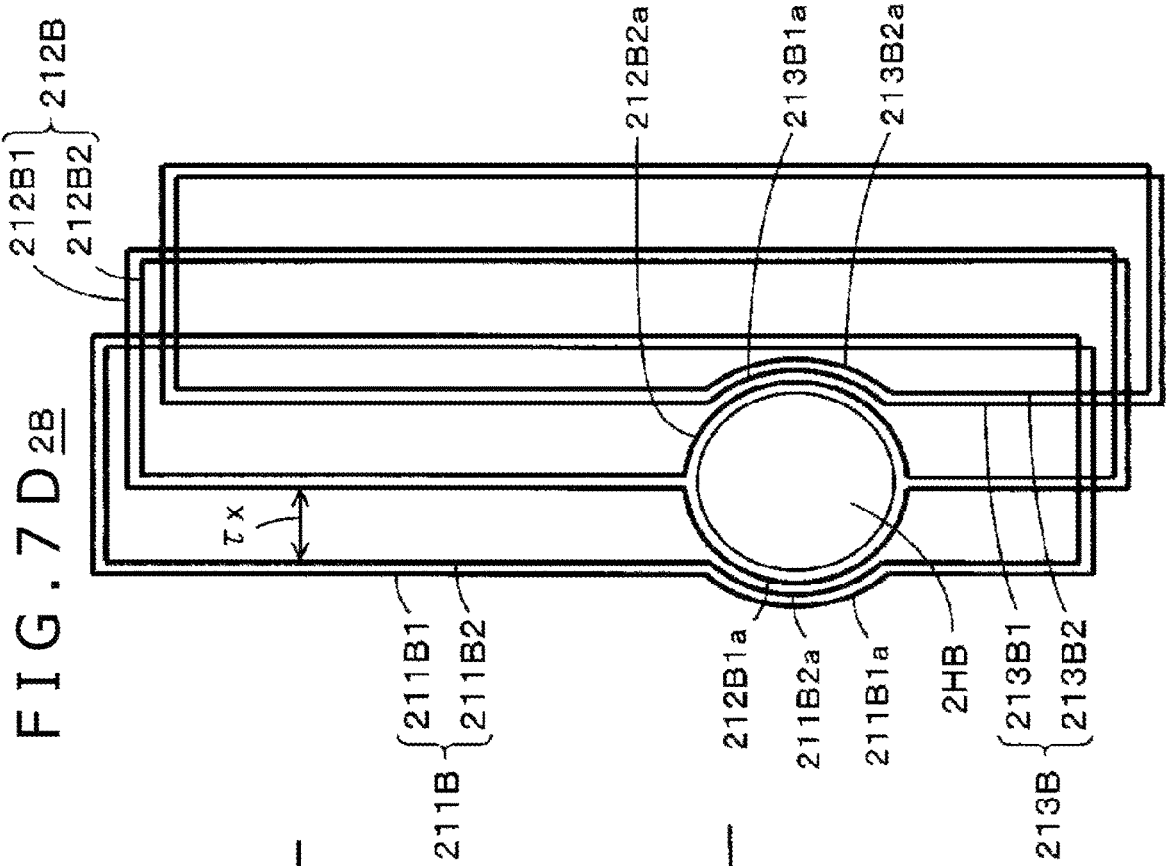
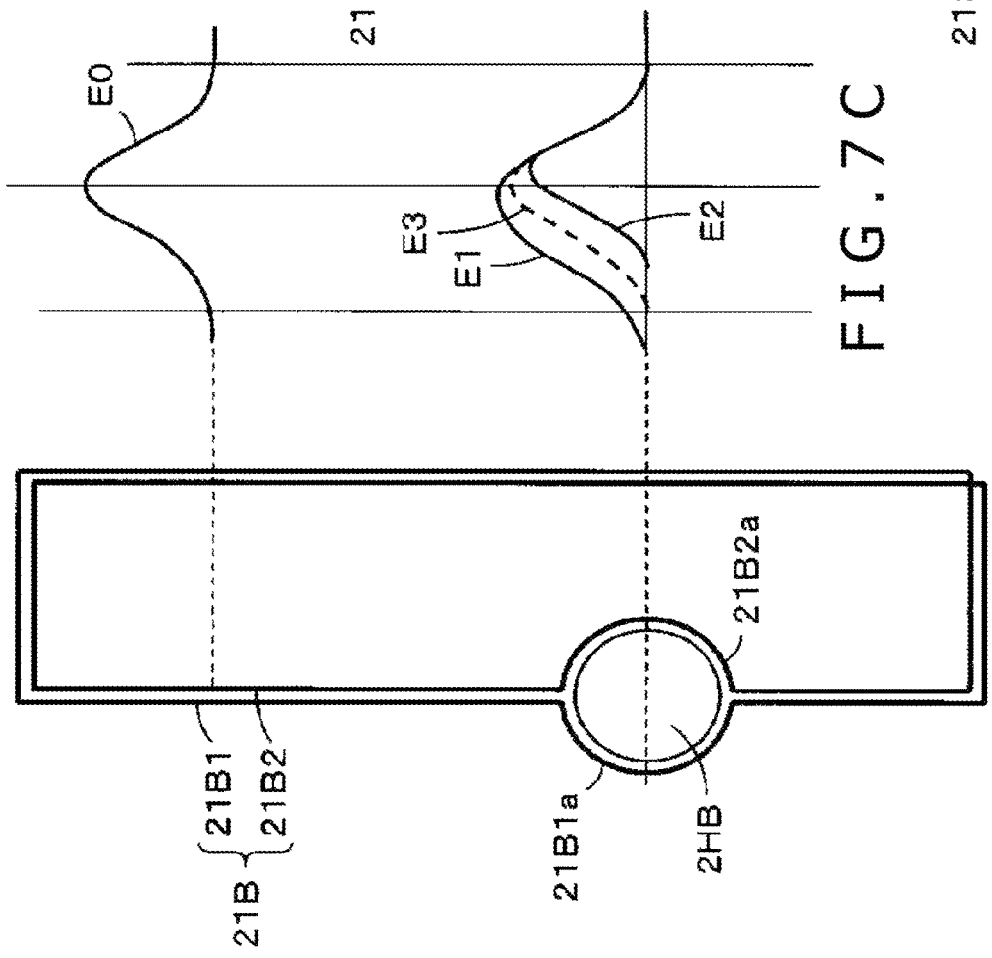

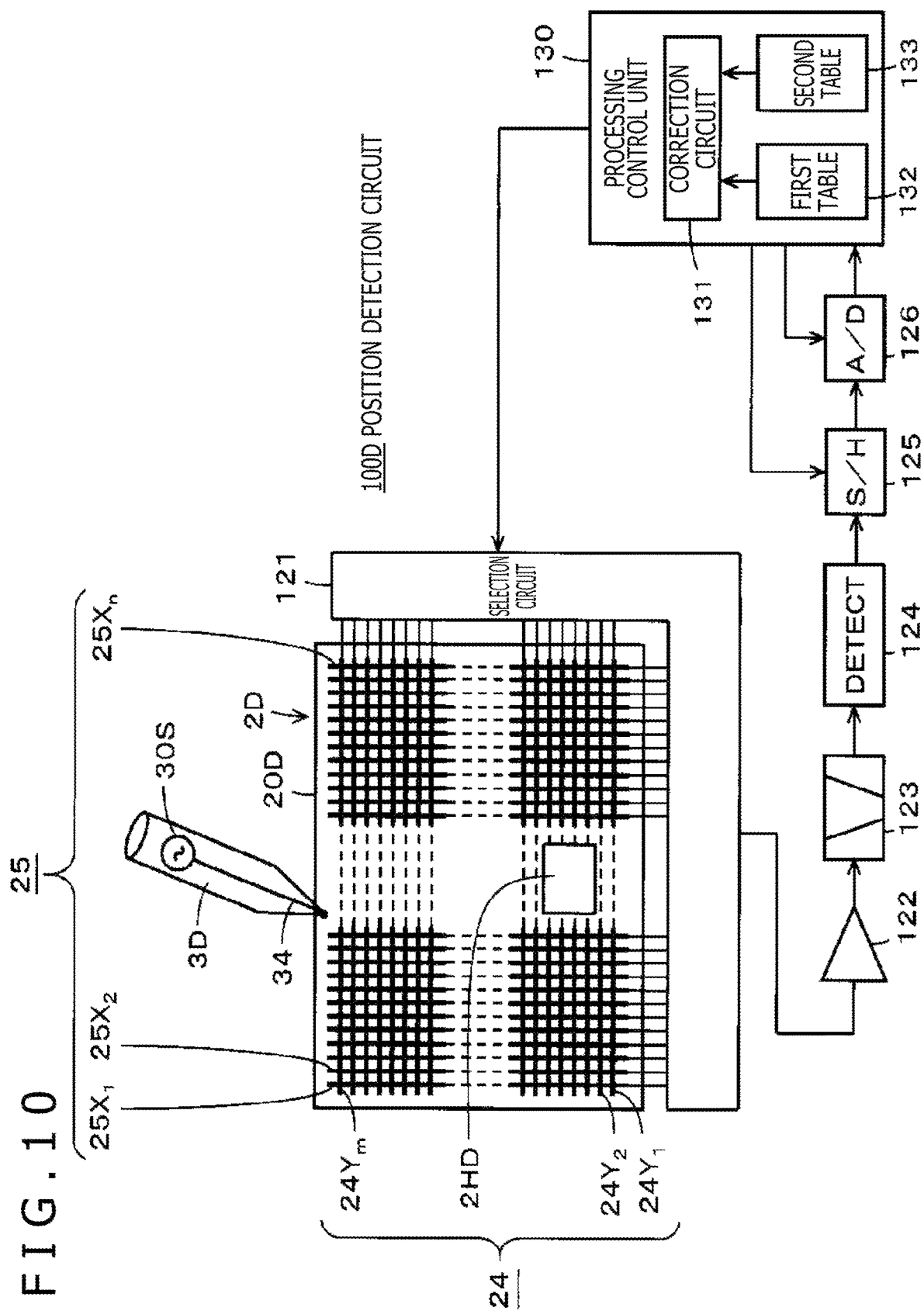

POSITION DETECTION SENSOR AND ELECTRONIC DEVICE

TECHNICAL FIELD

The invention relates to a position detection sensor and an electronic device using the position detection sensor.

BACKGROUND ART

A position detection sensor is used as operation input means in a portable electronic device, for example, wherein a surface panel of a housing can be used as an input surface to detect a position indicated by an indicator such as an electronic pen. A portable electronic device of this type is known that includes a display apparatus including, for example, an LCD (Liquid Crystal Display) arranged just below a transparent surface panel, and provided with a position detection sensor based on, for example, an electromagnetic induction system arranged on the back side of the display apparatus so as to overlap with a display screen of the display apparatus (see Patent Document 1, for example).

Recently, a large display screen can be realized by making a display region of the display screen to expand to include a region including an outer edge of the housing of the portable electronic device, even when the housing is small. Furthermore, substantially the entire display region of the display screen of the position detection sensor may be provided also as an effective region for detecting the indicated position of the indicator. In this case, the entire display screen corresponding to the position detection sensor serves as an operation input surface for the indicator such as an electronic pen.

PRIOR ART DOCUMENT

Patent Document

Patent Document 1: Japanese Patent Laid-open No. 2015-38714

SUMMARY OF INVENTION

Technical Problems

In the case of the portable electronic device described above, an electronic circuit unit is typically arranged in a space further behind the position detection sensor.

In recent years, as the functions of the portable electronic device have become more sophisticated, various components are mounted on the electronic circuit unit. Furthermore, the components include a component that needs to be optically exposed as opposed to being shielded as viewed from the display screen side, such as an LED (Light Emitting Diode) or other display elements, or a component that reads biological information or other information input from the display screen side, such as a fingerprint sensor that reads a fingerprint of a finger.

Conventionally, those components are arranged in edge regions, such as a lower edge and an upper edge, of the surface panel of the housing of the electronic device, and the position detection sensor and the display screen, such as an LCD, are arranged so as not to shield the upper portions of the components. Therefore, as the size of the display screen is reduced, the effective region of the position detection sensor is correspondingly reduced as a result.

However, recently, there are also components that, even when arranged on the back side of the display apparatus such as the LCD, can function effectively in response to operation or access from the front surface side of the LCD, without being disrupted by the LCD. For example, an ultrasonic fingerprint sensor is known. When the ultrasonic fingerprint sensor is used, the fingerprint of the finger placed on the surface panel can be detected without being affected by the LCD even when the ultrasonic fingerprint sensor is provided on the back side of the LCD. Therefore, when the ultrasonic fingerprint sensor is used, the fingerprint sensor can be arranged in a region of the display screen of the display apparatus, and the image can be displayed on the display screen of the LCD even in the display region corresponding to the fingerprint sensor.

However, in a case of an electronic device in which the position detection sensor as described above is arranged on the back side of the LCD to allow for input of an instruction using an indicator such as an electronic pen, the position detection sensor is arranged on the back side of the LCD, and an electronic circuit provided with the fingerprint sensor and the like is additionally arranged on the back side of the position detection sensor. In the case of the electronic device having such configuration, due to the existence of the position detection sensor, even the ultrasonic fingerprint sensor may not be able to detect the fingerprint of a finger placed on the surface panel.

Particularly, in a case of the position detection sensor of the electromagnetic induction system, a magnetic shielding material and an electromagnetic shielding material are provided in addition to a sensor substrate. The components arranged on the electronic circuit provided on the back side of the position detection sensor are disrupted by these materials, and the components may not function properly in response to operation or access from the surface panel side.

Accordingly, conventionally, the position detection sensor is arranged so as not to cover the upper portions of the components even if the components can be arranged on the back side in the display region of the display screen of the LCD. As a result, the effective detection region of the position detection sensor becomes smaller than the display region of the LCD, or as in the conventional technique, the components need to be arranged in regions not overlapping the LCD or the position detection sensor.

An object of the invention is to provide a position detection sensor that can solve these problems.

Technical Solution

To solve the problems,
provided is a position detection sensor including a plurality of position detection electrodes arranged on an insulating substrate, wherein a region provided with the plurality of position detection electrodes forms an effective detection region for detecting an indicated position of a position indicator, in which
a through hole in a predetermined shape is formed on the insulating substrate in the effective detection region, and
the position detection electrodes are arranged to bypass the through hole along the shape of the through hole at an area intersecting the through hole.

The position detection sensor with the above configuration includes the through hole in the predetermined shape formed in the effective detection region. Furthermore, the position detection sensor includes the position detection electrodes formed to bypass the through hole along the shape of the through hole, and therefore, the effective detection region of the position detection sensor includes the area of the through hole.

As a result, when a component obstructed by being shielded by the position detection sensor is to be arranged on the back side of the effective detection region of the position detection sensor, the component can be arranged at a position corresponding to the position of the through hole to allow the component to function without obstruction.

BRIEF DESCRIPTION OF DRAWINGS

FIG. 2 is an exploded perspective view for describing a configuration example of the electronic device of the example of FIG. 1.

FIGS. 6A and 6B are diagrams for describing main parts of a second embodiment of the position detection sensor according to the invention.

FIGS. 7A to 7D are diagrams for describing main parts of a third embodiment of the position detection sensor according to the invention.

FIG. 10 is a diagram for describing a circuit configuration example of another embodiment of the position detection sensor and the position detection circuit according to the invention.

MODES FOR CARRYING OUT THE INVENTION

Hereinafter, embodiments of a position detection sensor and an electronic device according to the invention will be described with reference to the drawings.

First Embodiment

Figure 1:
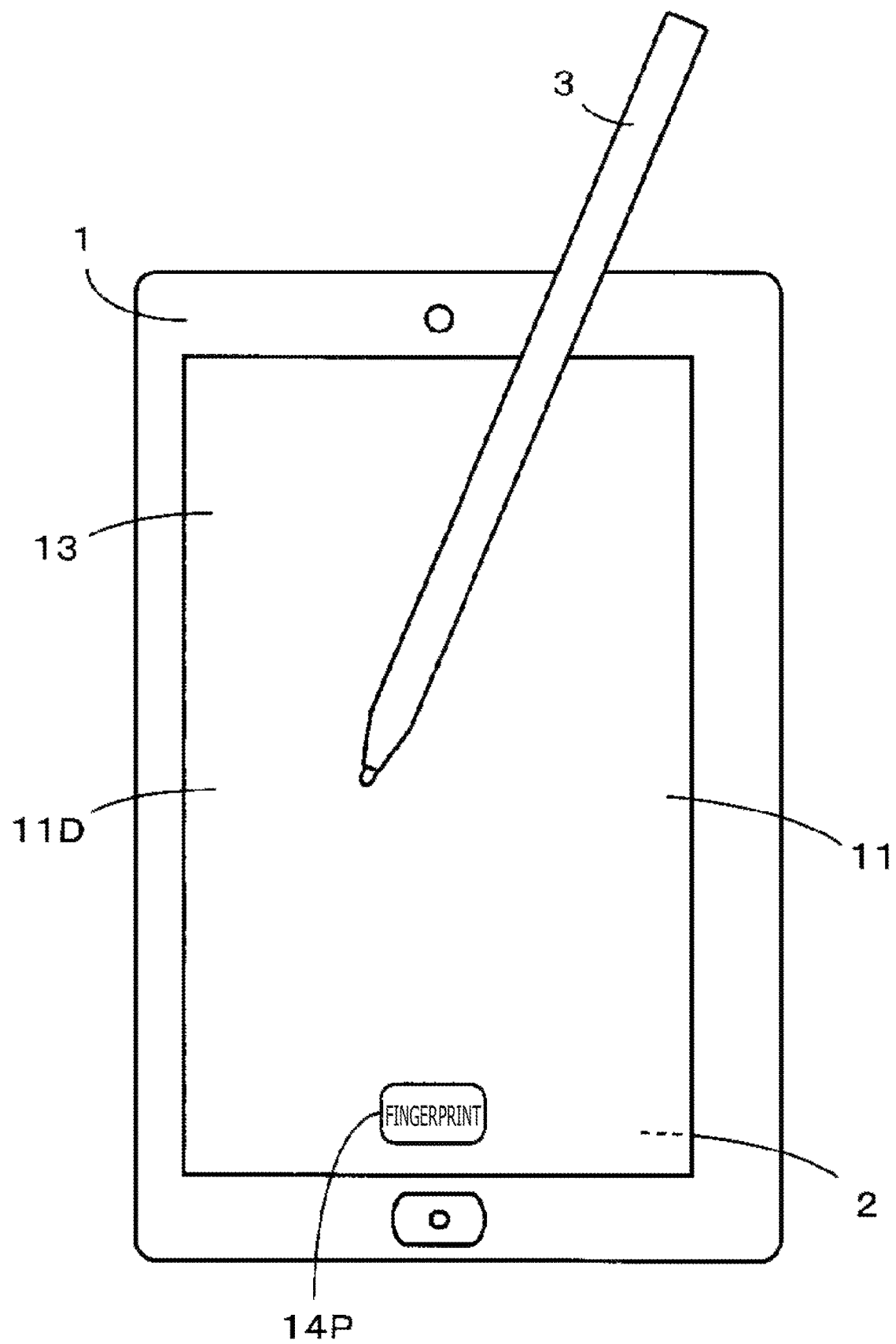
FIG. 1 is a diagram illustrating an example of an electronic device including a position detection sensor and a position detection circuit according to the invention.

FIG. 1 illustrates an example of the electronic device including an embodiment of the position detection sensor. An electronic device 1 of the example is a high-performance portable phone terminal including a display screen 11D of a display apparatus, which is an LCD 11 in the example. The electronic device 1 includes a position detection sensor 2 of the embodiment on a lower part (back side) of the LCD 11 and includes an electronic circuit, to be described later (not illustrated in FIG. 1), further behind the position detection sensor 2. The electronic circuit includes a position detection circuit connected to the position detection sensor 2.

Furthermore, the electronic device 1 of the example includes an electronic pen 3 as an example of an indicator for inputting and indicating a position to the position detection sensor 2. In the embodiment, the electronic pen 3 and the position detection sensor 2 transfer signals through electromagnetic induction coupling, and the position detection circuit detects the position indicated by the electronic pen 3 in an effective position detection region of the position detection sensor 2. In the example, the entire display region of the display screen 11D of the LCD 11 is the effective position detection region of the position detection sensor 2. Therefore, the entire display region of the display screen 11D provides the input surface in the position detection sensor 2, and the user can use the electronic pen 3 to perform the position indication operation, using the entire display region of the display screen 11D as an input surface.

In the electronic device 1, once the electronic pen 3 is used to perform the position indication input operation on the display screen 11D, the position detection sensor 2 provided on the back side of the display screen 11D and the electronic pen 3 perform signal interaction through electromagnetic induction coupling. The position detection circuit detects the position indicated and input by the electronic pen 3, and a computer connected to the position detection circuit of the electronic device 1 executes a display process according to the operation position on the display screen 11D.

FIG. 2 is an exploded perspective view for describing a configuration example of the electronic device 1 according to the embodiment. In the electronic device 1 of the embodiment, a motherboard 12 is housed in a bottom layer in a housing 10 as illustrated in FIG. 2. The position detection sensor 2 is arranged above the motherboard 12, and the LCD 11 is arranged further above the position detection sensor 2 with the display screen 11D facing up.

Furthermore, in the embodiment, the motherboard 12, the position detection sensor 2, and the LCD 11 are sequentially housed in a rectangular recessed portion 10a surrounded by a circumferential frame of the rectangular housing 10. A surface panel 13 comprising, for example, a transparent resin or transparent glass is arranged on the upper side of the LCD 11, and the circumference of the surface panel 13 is firmly fixed to the housing 10 to form the electronic device 1. The surface of the region of the surface panel 13 corresponding to the display screen 11D of the LCD 11 forms the operation input surface for the electronic pen 3.

As illustrated in FIGS. 1 and 2, the thickness of the circumferential frame of the rectangular recessed portion 10a of the housing 10 is thin in the electronic device 1 of the embodiment, and the display screen 11D of the LCD 11 occupies substantially the entire region of the recessed portion 10a. Therefore, the effective position detection region of the position detection sensor 2 also occupies substantially the entire region of the recessed portion 10a in accordance with the display region of the LCD 11.

Here, a communication circuit, a display control circuit for the display device 11, and a position detection circuit that supplies a signal to the position detection sensor 2 and receives a signal received through the position detection sensor 2 to detect the position indicated by the electronic pen 3 are formed on the motherboard 12. Note that each of the display device 11 and the position detection sensor 2 is connected to a corresponding circuit unit of the motherboard 12, although not illustrated in FIG. 2.

Furthermore, in the embodiment, the electronic device 1 has a function of permitting the user to start using the electronic device 1 through fingerprint authentication of the user. A fingerprint sensor 14 that detects the fingerprint of the user is arranged on the motherboard 12 as a component for the fingerprint authentication, and the electronic circuit of the motherboard 12 includes a fingerprint authentication circuit that receives information of the fingerprint read by the fingerprint sensor 14.

The fingerprint sensor 14 is an example of a predetermined component that, when shielded by the position detection sensor 2, may not be able to execute a function in response to operation or access in the region of the operation input surface of the surface panel 13. The fingerprint sensor 14 used in the embodiment can use ultrasound to recognize the fingerprint of the finger of the user, and as described above, the function of reading the fingerprint is not obstructed even when the LCD 11 exists between the fingerprint sensor 14 and the surface panel 13. However, as described above, the function of reading the fingerprint may be obstructed when the position detection sensor 2 exists between the fingerprint sensor 14 and the surface panel.

In view of this, a through hole 2H is formed in the position detection sensor 2 arranged on the top of the motherboard 12 in the embodiment, at a position corresponding to the space above the fingerprint sensor 14 of the motherboard 12. In the embodiment, the through hole 2H has a rectangular shape corresponding to the shape and the size of the fingerprint sensor 14 as illustrated in FIGS. 1 and 2. Note that the shape and the size of the through hole 2H can be any size and shape such that the predetermined component, such as the fingerprint sensor 14, arranged on the back side of the position detection sensor 2 is not prevented from reliably executing the intended function. The shape is not limited to the rectangular shape, and for example, the shape may be a circle, an ellipse, or a polygon such as a hexagon.

In this way, the fingerprint sensor 14 is arranged on the back side in the display region of the display screen 11D of the LCD 11 and the position detection sensor 2.

In the electronic device 1 of the embodiment, when the fingerprint authentication is used to determine whether or not to permit the user to start using the electronic device 1, the user, in advance, places the finger in the display region of the display screen 11D of the surface panel 13 and causes the fingerprint sensor 14 to read the fingerprint to register the fingerprint of the finger as described above. In this case, an image 14P for notifying the user of the position for reading the fingerprint is displayed at a position corresponding to the fingerprint sensor 14 of the display screen 11D as illustrated in FIG. 1. The fingerprint sensor 14 stores the information of the registered fingerprint of the finger as authentication reference information. Furthermore, after registering the information of the fingerprint of the finger as the authentication reference information, the electronic device 1 uses a fingerprint authentication application to execute the fingerprint authentication.

As is well known, the fingerprint authentication application uses the fingerprint sensor 14 to read the fingerprint of the finger once the user trying to start the electronic device 1 places the finger on the image 14P in the display region of the display screen 11D of the surface panel 13, and the fingerprint authentication application compares the fingerprint and the registered and stored fingerprint of the finger to check whether or not the user is authenticated on the basis of whether or not the fingerprints match each other. The fingerprint authentication application then operates to permit the user to start using the electronic device 1 when the authentication is confirmed. The fingerprint authentication process of the fingerprint authentication application is executed only when the user starts to use the electronic device 1.

After the user is permitted to start using the electronic device 1 in this way, the user can use the electronic pen 3 to indicate and input the position through the display region of the display screen 11D corresponding to the position detection sensor 2 to thereby cause the electronic device to execute various types of functional processing.

By the way, the position detection sensor 2 of the embodiment includes a plurality of position detection electrodes, which are loop coils in a case of the example, arranged in each of an X-axis direction (for example, the horizontal direction of the display screen 11D of the electronic device 1) and an Y-axis direction (for example, the vertical direction of the display screen 11D of the electronic device 1) orthogonal to each other as also described later. The array pitch of the plurality of loop coils in the X-axis direction and the Y-axis direction is generally relatively small, and the position indicated by the electronic pen 3 can be precisely detected.

In the case of the embodiment, the position detection electrodes cannot be formed at the area of the through hole 2H when the through hole 2H is formed in the effective region on the position detection sensor 2. When the size of the through hole 2H is smaller than the arrangement pitch of the loop coils, the through hole 2H can be provided in a free space between the position detection electrodes included in the loop coils so as not to obstruct position detection.

However, when the size of the through hole 2H is larger than the arrangement pitch of the loop coils, the position detection electrodes necessarily intersect or intersect the area of the through hole 2H. In this case, a state in which the position detection electrodes intersect the area of the through hole 2H denotes a state in which some of the conductors included in the position detection electrodes go across the through hole 2H when the position detection electrodes are arranged in a manner similarly as in the region not including the through hole 2H.

That is, each of the position detection electrodes in the example includes an elongated rectangular loop coil as described later, and the loop coil includes four linear sides. When one or both of the long sides of the four sides go across the through hole 2H when the long sides are linear, the loop coil, that is, the position detection electrode, intersects the through hole 2H. Note that the shape of the loop coil is not limited to the rectangular shape, and the shape may be any shape such that at least a portion of the conductor included in the loop coil goes across the through hole 2H when the position detection electrodes are arranged as in the region not including the through hole 2H.

When the through hole 2H is formed in the position detection sensor 2 after the plurality of loop coils are arranged and formed in each of the X-axis direction and the Y-axis direction, the loop coil intersecting the area of the through hole 2H is divided by the through hole 2H, and the loop coil intersecting the through hole 2H cannot be used as a loop coil for detecting the position indicated by the electronic pen 3.

To prevent the problem, the through hole 2H is formed in advance in the insulating substrate in the embodiment. The loop coils are formed as in the conventional technique on the insulating substrate in the region not including the through hole 2H. At the area intersecting the through hole 2H, the loop coils are formed and arranged to bypass or go around the through hole 2H, along the shape of the through hole 2H without being divided by the through hole 2H.

Figure 3:
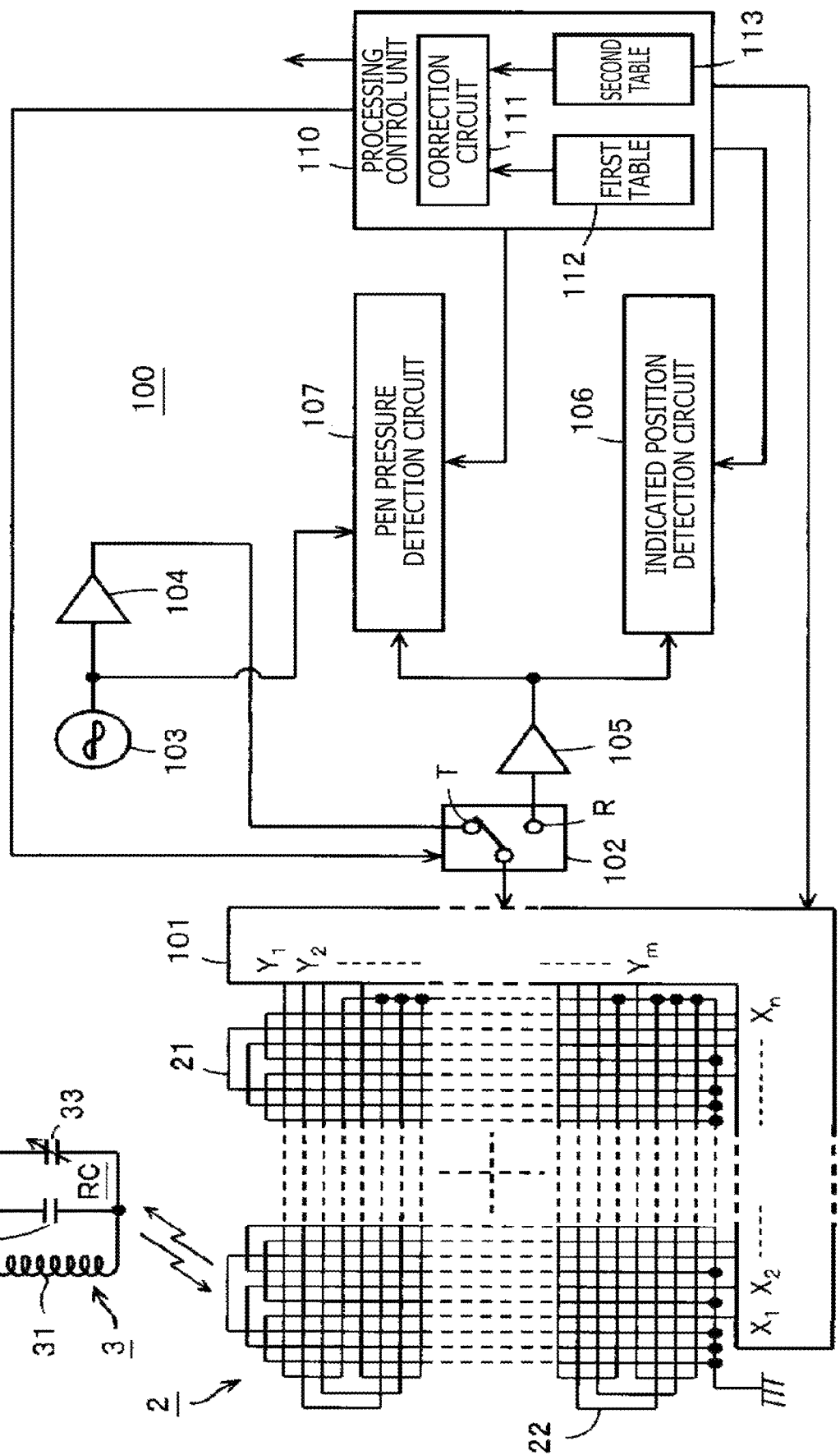
FIG. 3 is a diagram for describing a circuit configuration example of an embodiment of the position detection sensor and the position detection circuit according to the invention.

Configuration Examples of Position Detection Sensor 2 and Circuit Configuration Examples of Position Detection Circuit and Electronic Pen FIG. 3 is a diagram illustrating an overview of arrangement of loop coils as position detection electrodes of the position detection sensor 2 and illustrating electronic circuit configurations of a position detection circuit 100, which is connected to the position detection sensor 2, and the electronic pen 3. The position detection sensor 2 of the embodiment exchanges signals with (performs signal interaction with) a resonant circuit RC of the electronic pen 3 based on the electromagnetic induction system as described above.

The resonant circuit RC of the electronic pen 3 includes a coil 31, a capacitor 32, and a variable capacitor 33 including a pen pressure detection unit, which are connected in parallel as illustrated in FIG. 3. The resonant circuit RC is inductively coupled to the position detection sensor 2.

The position detection sensor 2 includes a plurality of X-axis direction loop coils 21 arranged at a predetermined pitch in an X-axis direction (for example, the horizontal direction) and a plurality of Y-axis direction loop coils 22 arranged at a predetermined pitch in an Y-axis direction (for example, the vertical direction) as illustrated in FIG. 3. In this case, the plurality of X-axis direction loop coils 21 and Y-axis direction loop coils 22 are arranged at a pitch narrower than the width of the loops so that the indicated position of the electronic pen 3 can be detected in high precision. To prevent the conductors included in the loop coils 21 and 22 from overlapping with each other on the same plane, both the front and back surfaces of an insulating substrate (not illustrated in FIG. 3) are used, and through holes are used to form the loop coils 21 and 22.

Figure 4A:
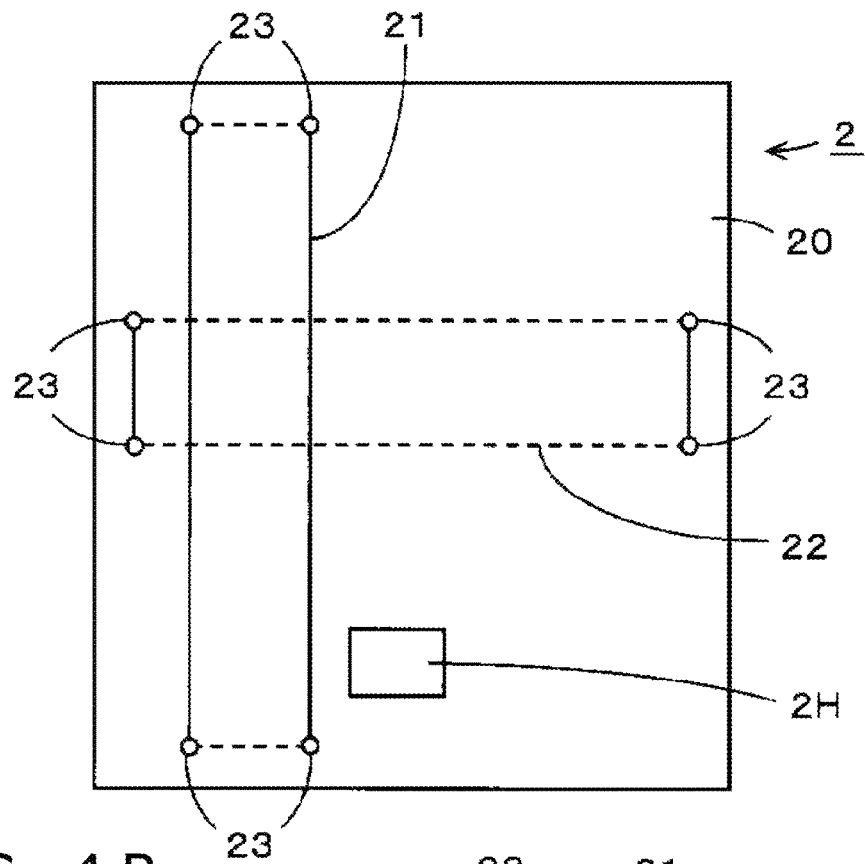
FIGS. 4A and 4B are diagrams for describing main parts of a first embodiment of the position detection sensor according to the invention.
Figure 4B:
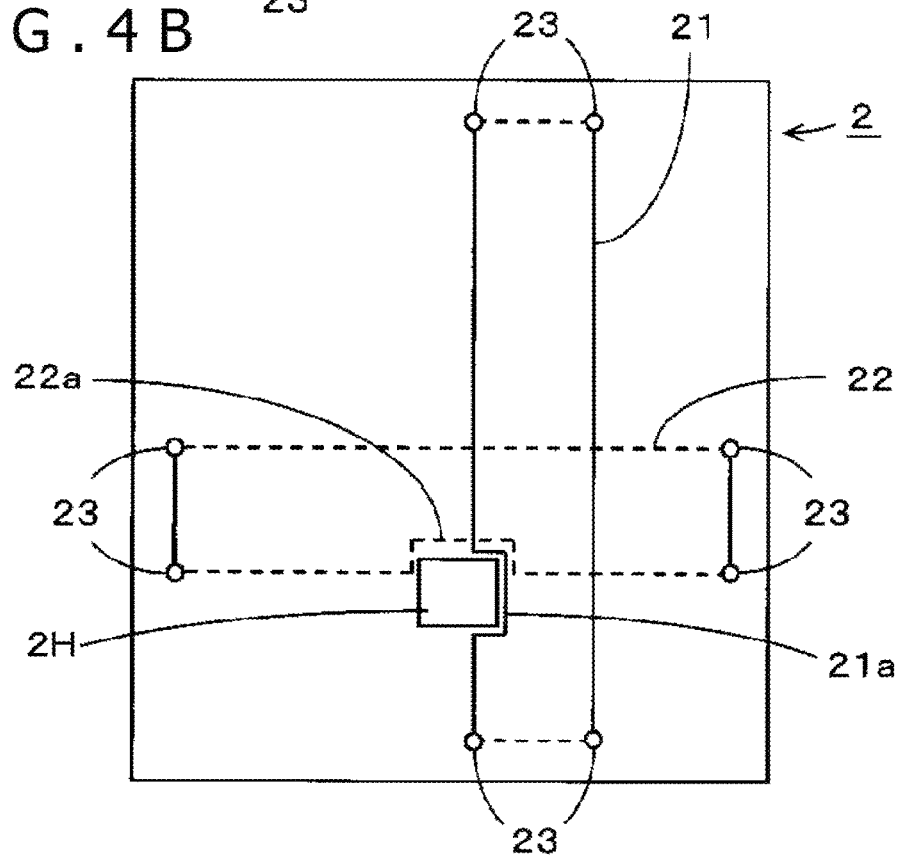

That is, FIGS. 4A and 4B each illustrates one of the X-axis direction loop coils 21 and one of the Y-axis direction loop coils 22 on the insulating substrate. FIG. 4A illustrates one X-axis direction loop coil 21 and one Y-axis direction loop coil 22 arranged at positions not intersecting the through hole 2H in an insulating substrate 20. FIG. 4B illustrates one X-axis direction loop coil 21 and one Y-axis direction loop coil 22 arranged at positions intersecting the through hole 2H in the insulating substrate 20. FIGS. 4A and 4B illustrate states as viewed from the front surface side of the insulating substrate 20. The conductors of the loop coils arranged on the front surface side of the insulating substrate 20 are indicated by solid lines, and the conductors of the loop coils arranged on the back surface side of the insulating substrate 20 are indicated by dashed lines.

As illustrated in FIG. 4A, the X-axis direction loop coil 21 has a vertically long rectangular loop shape in the example. Linear conductors on the long sides of the X-axis direction loop coil 21 are formed on the front surface of the insulating substrate 20, and linear conductors on the short sides are connected to the conductors on the long sides through through holes 23 and formed on the back surface. In addition, the Y-axis direction loop coil 22 has a horizontally long rectangular loop shape. Linear conductors on the long sides of the Y-axis direction loop coil 22 are formed on the back surface of the insulating substrate 20, and linear conductors on the short sides are connected to the conductors on the long sides through the through holes 23 and formed on the front surface.

Furthermore, as illustrated in FIG. 4B, the linear conductor on one of the two long sides in the example is deformed to bypass the circumference of the through hole 2H at the area intersecting the through hole 2H in each of the X-axis direction loop coil 21 and the Y-axis direction loop coil 22 intersecting the through hole 2H, and as a result bypass portions 21a and 22a are formed.

The loop coil generates electromotive force corresponding to the magnetic flux interlinked with the area surrounded by the loop coil. Therefore, when the loop shape of the loop coil is deformed, the area surrounded by the loop coil is changed, and the electromotive force is changed. As a result, the reception signal level of the signal from the electronic pen 3 based on electromagnetic induction coupling varies between the loop coil intersecting the through hole 2H and the loop coil not intersecting the through hole 2H.

In the embodiment, the bypass portions 21a and 22a of the X-axis direction loop coil 21 and the Y-axis direction loop coil 22 are formed to take the shortest routes along the shape of the through hole 2H. The through hole 2H has a rectangular shape in the example of FIG. 4B, and therefore, the bypass portions 21a and 22a are formed as indent portions in which the linear conductors on the long sides are bent at right angles along the shape of the through hole 2H.

In the embodiment, the bypass portions 21a and 22a are formed to take the shortest routes along the shape of the through hole 2H as in the example, and therefore, the deformation of the loop shapes of the X-axis direction loop coil 21 and the Y-axis direction loop coil 22 can be minimized. This can minimize the difference between the loop coil intersecting the through hole 2H and the loop coil not intersecting the through hole 2H in terms of the reception signal level of the signal from the electronic pen 3 based on electromagnetic induction coupling.

Although FIG. 4B illustrates a state in which one X-axis direction loop coil 21 and one Y-axis direction loop coil 22 intersect the through hole 2H, a plurality of X-axis direction loop coils 21 and a plurality of Y-axis direction loop coils 22 may intersect the through hole 2H when the size of the formation pitch is smaller than the through hole 2H. In this case, the plurality of X-axis direction loop coils 21 and Y-axis direction loop coils 22 intersecting the through hole 2H are configured so as to minimize, as much as possible, deformation of the loop shapes caused by bypassing the through hole 2H.

Figure 5:
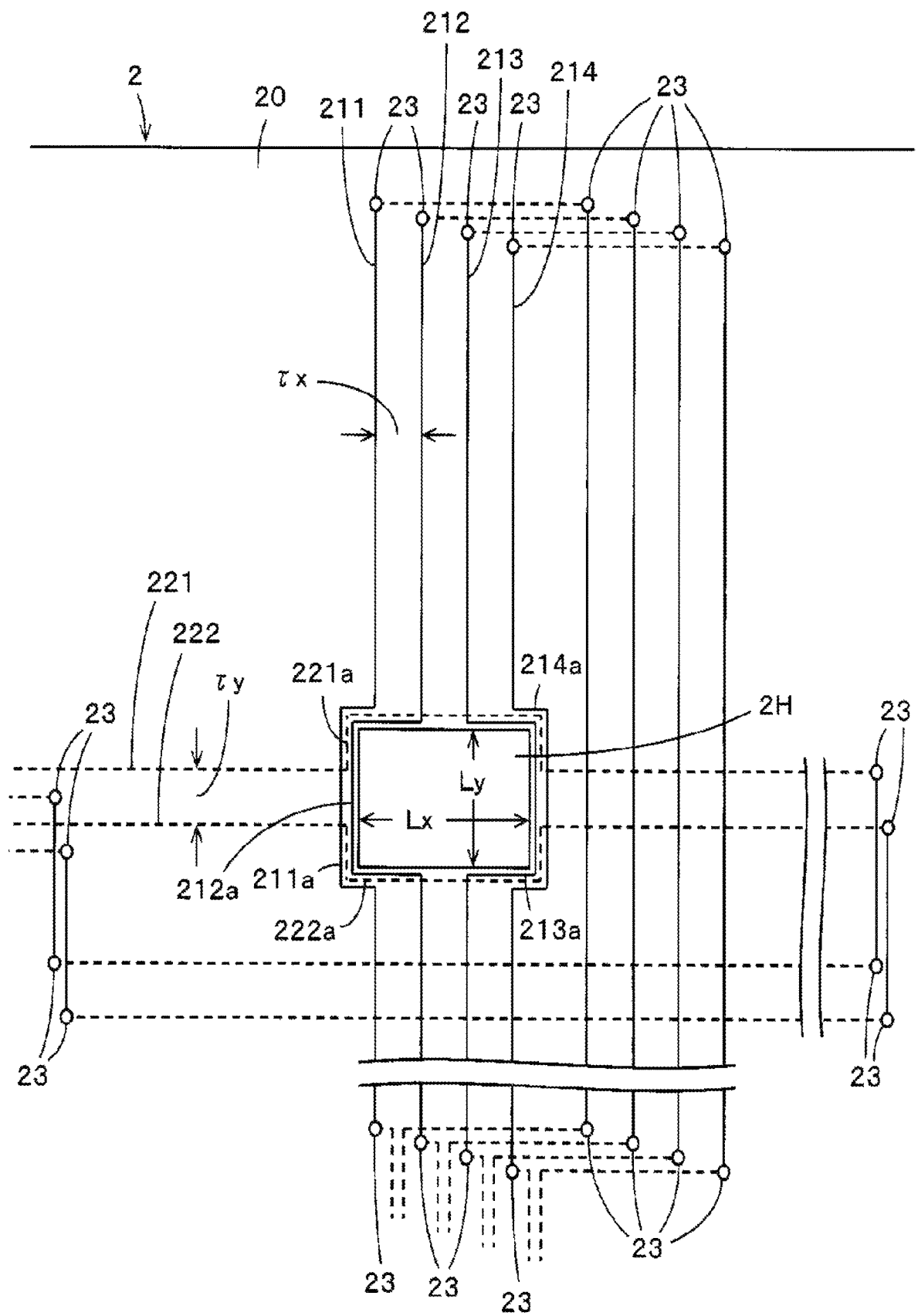
FIG. 5 is a diagram for describing main parts of the first embodiment of the position detection sensor according to the invention.

FIG. 5 illustrates an example of an arrangement pattern of the conductors of the plurality of X-axis direction loop coils 21 and Y-axis direction loop coils 22 intersecting the through hole 2H.

As illustrated in FIG. 5, the X-axis direction loop coils 21 are sequentially arranged in the X-axis direction at an array pitch τx smaller than an opening width Lx of the rectangular through hole 2H in the X-axis direction, and the Y-axis direction loop coils 22 are sequentially arranged in the Y-axis direction at an array pitch τy smaller than an opening width Ly of the rectangular through hole 2H in the Y-axis direction in the insulating substrate 20 of the position detection sensor 2 in the example.

FIG. 5 illustrates an example of the bypass pattern of conductors in a case in which one of the two long sides of four X-axis direction loop coils 21 (illustrated as a left side of each of X-axis direction loop coils 211, 212, 213, and 214 in FIG. 5) intersect the through hole 2H, and one of the two long sides of two Y-axis direction loop coils 22 (illustrated as an upper side of each of Y-axis direction loop coils 221 and 222 in FIG. 5) intersect the through hole 2H.

In the example of FIG. 5, bypass portions 211a and 212a projecting to the left side to bypass the left side of the through hole 2H are formed on the linear conductors on the long sides of the two X-axis direction loop coils 211 and 212 on the left side among the four X-axis direction loop coils 211 to 214, and bypass portions 213a and 214a projecting to the right side to bypass the right side of the through hole 2H are formed on the linear conductors of the long sides of the two X-axis direction loop coils 213 and 214 on the right side among the four X-axis direction loop coils 211 to 214.

In this case, the bypass portions 211a and 212a as well as the bypass portions 213a and 214a are formed close to each other and arranged without taking into account the array pitch τx in order to minimize the deformation of the loop shapes of the X-axis direction loop coils 211 to 214. However, needless to say, the bypass portions 211*a* and 212*a* as well as the bypass portions 213*a* and 214*a* are insulated from each other.

Furthermore, in the example of FIG. 5, a bypass portion 221*a* projecting to the upper side to bypass the upper side of the through hole 2H is formed on the linear conductor of the long side of the Y-axis direction loop coil 221, which is on the upper side of the two Y-axis direction loop coils 221 and 222, and a bypass portion 222*a* projecting to the lower side to bypass the lower side of the through hole 2H is formed on the linear conductor of the long side of the Y-axis direction loop coil 222, which is on the lower side of the two Y-axis direction loop coils 221 and 222.

The position detection circuit 100 is connected as illustrated in FIG. 3 to the position detection sensor 2 configured in this way, and the position detection circuit 100 detects the position indicated by the electronic pen 3 in the position detection sensor 2. In the example, the position detection circuit 100 uses electromagnetic coupling to transmit a signal to the resonant circuit RC of the electronic pen 3 through the position detection sensor 2, and the electronic pen 3 feeds back the signal received from the position detection sensor 2 to the position detection sensor 2 through the resonant circuit RC.

Furthermore, the position detection circuit 100 receives the feedback signal from the resonant circuit RC of the electronic pen 3 through the position detection sensor 2. The position detection circuit 100 detects the position indicated by the electronic pen 3 in the position detection sensor 2 based on the positions of the X-axis direction loop coil 21 and the Y-axis direction loop coil 22 of the position detection sensor 2 in which the received signal is detected. The position detection circuit 100 in the example detects the phase change of the signal received through electromagnetic coupling from the resonant circuit RC of the electronic pen 3 to detect the change in resonant frequency of the resonant circuit RC to thereby detect the pen pressure applied to the electronic pen 3.

The position detection circuit 100 includes a selection circuit 101 to which the X-axis direction loop coils 21 and the Y-axis direction loop coils 22 of the position detection sensor 2 are connected. In addition, the position detection circuit 100 includes a processing control unit 110 including, for example, a computer.

The selection circuit 101 sequentially selects the X-axis direction loop coils 21 and the Y-axis direction loop coils 22 to cause them to transmit signals to the resonant circuit RC of the electronic pen 3 and to receive signals fed back from the resonant circuit RC.

A switch circuit 102 switched and controlled by the processing control unit 110 is connected to the selection circuit 101. When the switch circuit 102 is connected to a transmission side terminal T, an AC signal is supplied from an oscillator 103 to the selection circuit 101 through an amplifier 104, and when the switch circuit 102 is connected to a reception side terminal R, a reception signal from the selection circuit 101 is supplied to an indicated position detection circuit 106 and a pen pressure detection circuit 107 through an amplifier 105.

The indicated position detection circuit 106 detects induced voltages, that is, reception signals, generated in the X-axis direction loop coils 21 and the Y-axis direction loop coils 22, converts the detected output signals into digital signals, and outputs the digital signals to the processing control unit 110. The processing control unit 110 calculates coordinate values of the indicated position of the electronic pen 3 in the X-axis direction and the Y-axis direction based on the digital signals from the indicated position detection circuit 106, that is, levels of voltage values of the induced voltages generated in the X-axis direction loop coils 21 and the Y-axis direction loop coils 22.

In this case, the processing control unit 110 in the embodiment includes a correction circuit 111 to account for the position detection sensor 2 that includes the through hole 2H in the effective region.

The correction circuit 111 has a processing function (a function of calculating an indicated position in a through hole) that can calculate the coordinate values of the indicated position as accurately as possible when the indicated position of the electronic pen 3 is in a region of the through hole 2H, and has a function (a function of correcting an indicated position outside of a through hole) of making a correction to more accurately calculate the coordinate values of the indicated position even when the indicated position of the electronic pen 3 is in a region outside of the through hole 2H when the coordinate position needs to be detected from the reception signals of the feedback signals from the resonant circuit of the electronic pen 3 in the X-axis direction loop coil 21 and the Y-axis direction loop coil 22 that are intersecting the through hole 2H.

As for the former function of calculating an indicated position in a through hole, an example of a method of calculating the indicated position when the indicated position of the electronic pen 3 is in a region of the through hole 2H is described below.

First, the electronic pen 3 is used in advance to indicate a plurality of positions, which correspond to the detection accuracy, within the region of the through hole 2 of the position detection sensor 2, and the output signal levels of the indicated position detection circuit 106 regarding the signals obtained from one or a plurality of X-axis direction loop coils 21 and one or a plurality of Y-axis direction loop coils 22 intersecting the through hole 2H are obtained at each of the indicated positions. Furthermore, the information of the indicated position of the electronic pen 3 and the output signal levels of the indicated position detection circuit 106 regarding the signals obtained from one or a plurality of X-axis direction loop coils 21 and one or a plurality of Y-axis direction loop coils 22 are associated and stored as first table information in a first table memory 112. Note that the first table information may obviously include not only the output signal levels of the X-axis direction loop coils 21 and the Y-axis direction loop coils 22 intersecting the through hole 2H, but also the output signal levels of the X-axis direction loop coils 21 and the Y-axis direction loop coils 22 around them.

Furthermore, when the processing control unit 110 in detecting the position indicated by the electronic pen 3 determines that the indicated position is in a region of the through hole 2H, the processing control unit 110 compares the output signal levels of the first table information of the first table memory 112 and the output signal level of the indicated position detection circuit 106 at that time, and acquires from the first table information of the first table memory 112 a matching or resembling indicated position to thereby detect the indicated position in the region of the through hole 2H. Note that, when a plurality of output signal levels of the first table information of the first table memory 112 resemble the output signal level of the indicated position detection circuit 106 at that time, an interpolation operation may be performed on the basis of the plurality of resembling output signal levels of the first table information to calculate a more accurate indicated position.

Note that, in this case, the X-axis direction loop coil 21 and the Y-axis direction loop coil 22 intersecting the through hole 2H are known to the position detection sensor 2. Therefore, whether or not the position indicated by the electronic pen 3 is in the region of the through hole 2H can be determined by determining whether or not the X-axis direction loop coil 21 and the Y-axis direction loop coil 22 indicating peak values among the X-axis direction loop coils 21 and the Y-axis direction loop coils 22, from which output signals of equal to or higher than a predetermined level are obtained by the indicated position detection circuit 106, are the X-axis direction loop coil 21 and the Y-axis direction loop coil 22 intersecting the through hole 2H.

Next, the latter function of correcting an indicated position outside of a through hole will be described. As described above, the X-axis direction loop coil 21 and the Y-axis direction loop coil 22 intersecting the through hole 2H include the bypass portions 21a and 22a, and therefore, the loop shapes are deformed with respect to the other X-axis direction loop coils 21 and Y-axis direction loop coils 22 not intersecting the through hole 2H.

As a result, even when the indicated position of the electronic pen 3 is in a region outside of the through hole 2H instead of being in a region of the through hole 2H, the output signal levels of the signals fed back from the resonant circuit RC of the electronic pen 3 when the X-axis direction loop coil 21 and the Y-axis direction loop coil 22 intersecting the through hole 2H receive the signals may be different from the output signal levels of the other X-axis direction loop coils 21 and Y-axis direction loop coils 22 not intersecting the through hole 2H.

In the embodiment, the X-axis direction loop coils 21 and the Y-axis direction loop coils 22 of the position detection sensor 2 have elongated rectangular shapes, and moreover, the electronic pen 3 is thin. The magnetic flux based on the electromagnetic energy fed back from the electronic pen 3 is concentrated around the position indicated by the electronic pen 3 and is interlinked with the loop coils 21 and 22. Therefore, when the size of the through hole 2H (a length in the X-axis direction and a length in the Y-axis direction) is smaller than the length of the loop coils 21 and 22 in the long side direction, the area where the magnetic flux based on the electromagnetic energy fed back from the electronic pen 3 is interlinked is changed in the X-axis direction loop coil 21 and the Y-axis direction loop coil 22 when the position indicated by the electronic pen 3 is in a region of a predetermined range around the through hole 2H (excluding the inside of the through hole). The predetermined range around the through hole 2H (hereinafter, referred to as a "correction necessary range") can be appropriately set by inspecting the output signals obtained from the X-axis direction loop coil 21 and the Y-axis direction loop coil 22 intersecting the through hole 2H based on the magnetic flux generated by the electromagnetic energy fed back from the electronic pen 3 and determining a position range in which correction is needed.

In view of the above, the detected output levels from the indicated position detection circuit 106, at the time that the signal fed back from the resonant circuit RC of the electronic pen 3 is received by the X-axis direction loop coil 21 and the Y-axis direction loop coil 22 intersecting the through hole 2H, may be corrected in the embodiment when the position indicated by the electronic pen 3 is in the correction necessary range, and therefore may be treated similarly as in a case where there is no area change caused by the bypass portions of the through hole 2H. The processing control unit 110 includes a second table memory 113 for storing second table information in which the correction signals for the correction are associated with the positions in the correction necessary range of the X-axis direction loop coil 21 and the Y-axis direction loop coil 22 intersecting the through hole 2H.

When the position indicated by the electronic pen 3 is in a correction necessary range, the processing control unit 110 uses the correction signals of the second table information of the second table memory 113 to correct, according to the position indicated by the electronic pen 3, the detected output levels from the indicated position detection circuit 106 at the time that the signal fed back from the resonant circuit RC of the electronic pen 3 is received by the X-axis direction loop coil 21 and the Y-axis direction loop coil 22 intersecting the through hole 2H, and use the corrected output levels in detecting the indicated coordinate position.

Note that, when a through hole that is large in the longitudinal direction of the rectangular X-axis direction loop coil 21 and Y-axis direction loop coil 22, for example, is formed in the position detection sensor 2, regardless of the position indicated by the electronic pen 3 in the X-axis direction loop coil 21 and the Y-axis direction loop coil 22, the area where the magnetic flux based on the electromagnetic energy fed back from the electronic pen 3 is interlinked is affected by area variation caused by the provision of the bypass portions that bypass the through hole.

In such a case, the detected output levels from the indicated position detection circuit 106 at the time that the signal is received by the X-axis direction loop coil 21 and the Y-axis direction loop coil 22 intersecting the through hole 2H may be corrected regardless of the indicated position of the electronic pen 3.

The pen pressure detection circuit 107 uses an AC signal from the oscillator 103 to perform synchronous detection of an output signal of the reception amplifier 105 to obtain a signal in a level corresponding to the phase difference (frequency shift) between the AC signal and the output signal. The pen pressure detection circuit 107 converts the signal corresponding to the phase difference (frequency shift) into a digital signal and outputs the digital signal to the processing control unit 110. The processing control unit 110 detects the pen pressure applied to the electronic pen 3 based on the level of the digital signal from the pen pressure detection circuit 107, that is, the signal corresponding to the phase difference (frequency shift) between the transmitted radio wave and the received radio wave.

The processing control unit 110 receives the information of the pen pressure detected by the pen pressure detection circuit 107 and holds the information in association with the coordinate information of the indicated position of the electronic pen 3 detected from the output signal from the indicated position detection circuit 106. The processing control unit 110 outputs the information to an external circuit as needed.

As described above, the position detection sensor 2 of the embodiment includes the through hole 2H in the effective region corresponding to the fingerprint sensor 14 arranged on the back side of the effective position detection region. Therefore, the fingerprint sensor 14 arranged on the back side of the position detection sensor 2 can read the fingerprint of the finger placed on the surface panel 13 without any obstruction.

Furthermore, in the area of the through hole 2H in the position detection sensor 2, the conductors of the X-axis direction loop coil 21 and the Y-axis direction loop coil 22 intersecting the through hole 2H are arranged to bypass the through hole 2H along the shape of the through hole 2H, to thereby avoid the problem of not being able to detect the indicated position of the electronic pen 3 in the effective region due to the through hole 2H provided in the position detection sensor 2.

Furthermore, in the position detection sensor 2 of the embodiment, the bypass portions of the through hole 2H in the X-axis direction loop coil 21 and the Y-axis direction loop coil 22 intersecting the through hole 2H are formed to bypass the through hole 2H by taking the shortest routes. This can minimize the change in the area surrounded by the loops that is caused by changing the loop shapes of the X-axis direction loop coil 21 and the Y-axis direction loop coil 22 due to the bypass portions, to thereby reduce the change in electromotive force caused by the interlinked magnetic flux. In addition, when there are a plurality of X-axis direction loop coils 21 and Y-axis direction loop coils 22 intersecting the through hole 2H, the bypass portions of the plurality of X-axis direction loop coils 21 and Y-axis direction loop coils 22 may be arranged close to each other. This can similarly reduce the change in the area of the loops that is caused by deforming the X-axis direction loop coils 21 and the Y-axis direction loop coils 22 due to the bypass portions, to thereby reduce the change in electromotive force caused by the interlinked magnetic flux.

Furthermore, the position detection circuit of the embodiment uses the correction signals provided by the second table information of the second table memory 133 to correct the signal levels of the reception signals obtained from the X-axis direction loop coil 21 and the Y-axis direction loop coil 22 intersecting the through hole 2H, in the correction necessary range around the through hole 2H, so that the signal levels become equivalent to the signal levels of the reception signals obtained from the X-axis direction loop coil 21 and the Y-axis direction loop coil 22 not having any change caused by the bypass portions bypassing the through hole 2H. This can minimize the degradation in the accuracy of the coordinates of the position indicated by the electronic pen 3 even when the effective region includes the through hole 2H.

Furthermore, in the position detection circuit of the embodiment, the X-axis direction loop coil 21 and the Y-axis direction loop coil 22 include the bypass portions bypassing the through hole 2H, and the first table information for calculating the indicated position in the region of the through hole 2H is stored. Therefore, the indicated position of the electronic pen 3 can be detected as described above even when the position is indicated by the electronic pen 3 in the region of the through hole 2H.

Note that the number of turns of the X-axis direction loop coils 21 and the Y-axis direction loop coils 22 is not limited to one, and there may be a plurality of turns.

Second Embodiment of Position Detection Sensor

In the first embodiment, the loop coil intersecting the through hole 2H includes the linear conductor forming the bypass portion bypassing the through hole 2H in the shortest route as described above, and the area surrounded by the loop is different from that of the other loop coils not intersecting the through hole 2H. Therefore, the second table information is used to correct for the difference between the loop coil intersecting the through hole 2H and the loop coil not intersecting the through hole 2H regarding the reception signal level of the signal from the electronic pen 3 based on electromagnetic induction coupling. This minimizes the variation in detection accuracy of the position in the position detection sensor 2 indicated by the electronic pen 3.

However, the correction using the second table information is not necessary if the difference in the area surrounded by the loop is zero between the loop coil intersecting the through hole 2H and the other loop coils not intersecting the through hole 2H. In addition, if the difference in the area surrounded by the loop can be reduced between the loop coil intersecting the through hole 2H and the other loop coils not intersecting the through hole 2H, the correction using the second table information becomes a correction for the smaller difference, to thereby increase the accuracy of position detection.

A second embodiment illustrated below is an example in which the shape of the loop coil intersecting the through hole 2H of the position detection sensor 2 is devised to cancel or diminish the change in the area caused by the bypass portion around the through hole 2H so that the correction using the second table information is not necessary or the correction using the second table information is minimized, thereby further improving the accuracy of position detection.

FIG. 6A illustrates one X-axis direction loop coil 21A intersecting the through hole 2H formed in the insulating substrate 20, to describe main parts of a position detection sensor 2A of the second embodiment.

As illustrated in FIG. 6A, in the position detection sensor 2A of the second embodiment, the X-axis direction loop coil 21A is formed such that the shape around the through hole 2H of the conductor forming the X-axis direction loop coil 21A is a shape that compensates for the increase or decrease in the area (a decrease in the area in a case of FIG. 6A) surrounded by the loop formed by a bypass portion 21Aa corresponding to the bypass portion 21a in the position detection sensor 2 of the first embodiment.

That is, as illustrated in FIG. 6A, the conductor included in the X-axis direction loop coil 21A is arranged to form the bypass portion 21Aa projecting to the right side with respect to the linear long side of the X-axis direction loop coil 21A to bypass the through hole 2H, and is arranged to form opposite projection portions 21Ab and 21Ac deformed to project to the left side, which is the direction opposite the projecting direction of the bypass portion 21Aa, with respect to the linear long side of the X-axis direction loop coil 21A at portions just before and after the conductor intersects the through hole 2H, so as to cancel the increase or decrease in the area surrounded by the loop coil 21A due to the bypass portion 21Aa.

In this example, the total area of the opposite projection portions 21Ab and 21Ac of the X-axis direction loop coil 21A just before and after the X-axis direction loop coil 21A intersects the through hole 2H, which project to the left side with respect to the linear long side of the X-axis direction loop coil 21A, is substantially equal to the area of the bypass portion 21Aa that projects to the right side with respect to the linear long side of the X-axis direction loop coil 21A.

Note that, in FIG. 6A, the opposite projection portions 21Ab and 21Ac of the X-axis direction loop coil 21A at the portions just before or after the X-axis direction loop coil 21A intersects the through hole 2H are formed to have similar areas. However, the opposite projection portions 21Ab and 21Ac do not have to be formed to have similar areas as long as the total area of the opposite projection portions 21Ab and 21Ac is substantially equal to the area of the bypass portion 21Aa. In addition, it is also not essential to provide both of the opposite projection portions 21Ab and 21Ac of the X-axis direction loop coil 21A at the portions just before and after the X-axis direction loop coil 21A intersects the through hole 2H, and only one may be provided—either the opposite projection portion 21Ab of the X-axis direction loop coil 21A at the portion just before the X-axis direction loop coil 21A intersects the through hole 2H, or the opposite projection portion 21Ac of the X-axis direction loop coil 21A at the portion just after the X-axis direction loop coil 21A intersects the through hole 2H.

Although FIG. 6A illustrates only one X-axis direction loop coil 21A according to the second embodiment and does not illustrate a Y-axis direction loop coil 22A according to the second embodiment, the Y-axis direction loop coil 22A may also be formed similarly to the X-axis direction loop coil 21A by providing opposite projection portions at portions just before and/or after the Y-axis direction loop coil 22A intersects the through hole 2H such that the area of the opposite projection portions is substantially equal to the area of a bypass portion 22Aa (not illustrated) of the Y-axis direction loop coil 22A.

Note that, in the position detection sensor 2A of the second embodiment, there may also be a plurality of X-axis direction loop coils 21 and Y-axis direction loop coils 22 intersecting the through hole 2H when the array pitches τx and τy of the X-axis direction loop coils 21 and the Y-axis direction loop coils 22 are smaller than the horizontal length Lx and the vertical length Ly of the through hole 2H.

FIG. 6B illustrates an example of an arrangement pattern of a plurality of X-axis direction loop coils 21A and Y-axis direction loop coils 22A intersecting the through hole 2H in the position detection sensor 2A according to the second embodiment. FIG. 6B is a diagram corresponding to FIG. 5 of the position detection sensor 2 of the first embodiment. In FIG. 6B, the same reference signs are assigned to parts similar to the parts of the position detection sensor 2 of the first embodiment illustrated in FIG. 5, and their description will not be repeated.

In the example of FIG. 6B, one of the two long sides of four X-axis direction loop coils 211A, 212A, 213A, and 214A intersect the through hole 2H, and one of the two long sides of two Y-axis direction loop coils 221A and 222A intersect the through hole 2H.

Furthermore, in the example of FIG. 6B, linear conductors of the long sides of two X-axis direction loop coils 211A and 212A on the left side among the four X-axis direction loop coils 211A to 214A include bypass portions 211Aa and 212Aa projecting to the left side to bypass the left side of the through hole 2H and include opposite projection portions 211Ab and 212Ab projecting to the right side at portions just before and/or after the linear conductors intersect the through hole 2H in the example. In this case, the amount of projection of the opposite projection portion 211Ab is larger than the amount of projection of the opposite projection portion 212Ab as illustrated in FIG. 6B.

In addition, linear conductors of the long sides of two X-axis direction loop coils 213A and 214A on the right side include bypass portions 213Aa and 214Aa projecting to the right side to bypass the right side of the through hole 2H and include opposite projection portions 213Ab and 214Ab projecting to the left side at portions just before and/or after the linear conductors intersect the through hole 2H in the example. In this case, the amount of projection of the opposite projection portion 214Ab is larger than the amount of projection of the opposite projection portion 213Ab as illustrated in FIG. 6B.

Furthermore, in a case of the example of FIG. 6B, the linear conductor of the upper long side of the Y-axis direction loop coil 221A, which is on the upper side between the two Y-axis direction loop coils 221A and 222A, includes a bypass portion 221Aa projecting to the upper side to bypass the upper side of the through hole 2H and includes opposite projection portions 221Ab and 221Ac projecting to the lower side at portions just before and/or after the linear conductor intersects the through hole 2H in the example. In addition, the linear conductor of the long sides of the Y-axis direction loop coil 222A, which is on the lower side, includes a bypass portion 222Aa projecting to the lower side to bypass the lower side of the through hole 2H and includes opposite projection portions 222Ab and 222Ac projecting to the upper side at portions just before and/or after the linear conductor intersects the through hole 2H in the example.

As illustrated in FIG. 6B, the opposite projection portions need to be provided without the conductors coming into contact with each other in the plurality of X-axis direction loop coils 211A to 214A and Y-axis direction loop coils 221A and 222A, and it is difficult for each of the opposite projection portions to have an area similar to the area of each of the bypass portions 21Aa and 22Aa. Therefore, in such cases, the correction based on the second table information may be used for each of the plurality of X-axis direction loop coils 21A (211A to 214A) and Y-axis direction loop coils 22A (221A and 222A) intersecting the through hole 2H. However, as described above, the correction values of the second table information in a case of the position detection sensor 2A of the second embodiment can be made smaller than those in the first embodiment, to thereby improve the accuracy of position detection as described above.

In this way, the opposite projection portions are formed on the X-axis direction loop coils 21A (211A to 214A) and the Y-axis direction loop coils 22A (221A and 222A) intersecting the through hole 2H to compensate for the increase or decrease in the area surrounded by the bypass portions bypassing the through holes in the position detection sensor 2A of the second embodiment. This can eliminate or reduce the difference in the area between the loop coil intersecting the through hole 2H and the loop coil not intersecting the through hole 2H. This provides an advantageous effect that the correction using the second table information can be omitted or the correction values based on the second table information can be reduced to further suppress the degradation in position detection accuracy.

Note that, in the second embodiment, the first table information may also be generated and stored, and the position may also be detected when the position indicated by the electronic pen is in the region of the through hole 2H, as described in the first embodiment.

Note that the number of turns of the X-axis direction loop coils 21 and the Y-axis direction loop coils 22 is not limited to one, and there may be a plurality of turns.

Third Embodiment of Position Detection Sensor

A third embodiment is also an example in which the shape of the loop coil intersecting the through hole 2H of the position detection sensor 2 is devised to cancel or diminish the change in the area caused by the bypass portion around the through hole 2H so that the correction using the second table information is not necessary or the correction using the second table information is minimized, thereby further improving the accuracy of position detection.

In the position detection sensors 2 and 2A of the first and second embodiments, the bypass portions 21a and 21Aa and the bypass portions 22a and 22Aa of the through hole 2H are formed so that all loop conductor portions project in similar directions not only when the X-axis direction loop coils 21 and 21A and the Y-axis direction loop coils 22 and 22A have one turn, but also when they have a plurality of turns.

However, when the number of turns of the X-axis direction loop coils and the Y-axis direction loop coils is an even number, the bypass portion formed on one half of the even number of turns may be made to project in a direction opposite from the projecting direction of the bypass portion formed on the other half of the even number of turns. This can eliminate or reduce the difference in the area occupied by a loop shape between the loop coil intersecting the through hole and the loop coil not intersecting the through hole.

FIGS. 7A and 7B illustrate one X-axis direction loop coil 21B intersecting a through hole 2HB formed in the insulating substrate 20 to describe main parts of a position detection sensor 2B of the third embodiment. In the position detection sensor 2B of the example in FIG. 7A, each of the X-axis direction loop coil 21B and a Y-axis direction loop coil 22B (not illustrated) has two turns. Furthermore, in the example of FIG. 7A, the shape of the through hole 2HB is a circular shape for which a straight line crossing the center is a line-symmetric axis.

In the example illustrated in FIG. 7A, the linear X-axis direction loop coil 21B is arranged to intersect the through hole 2HB in a state in which the X-axis direction loop coil 21B crosses the center of the circular through hole 2HB when the X-axis direction loop coil 21B does not bypass the through hole 2HB.

Furthermore, a half of the X-axis direction loop coil 21B with two turns, such as a conductor of a first turn 21B1, is arranged to form a bypass portion 21B1a in a shortest route along the through hole 2HB on the left side of the through hole 2HB as illustrated in FIG. 7A, and the remaining half, which is a conductor of a second turn 21B2, is arranged to form a bypass portion 21B2a in a shortest route along the through hole 2HB on the right side of the through hole 2HB as illustrated in FIG. 7A.

In the case of FIG. 7A, the X-axis direction loop coil 21B intersects the through hole 2HB in the state in which the linear conductor crosses the center position of the circular through hole 2HB when the X-axis direction loop coil 21B does not bypass the through hole 2HB, and the bypass portion 21B1a and the bypass portion 21B2a bypass portions corresponding to the half circles of the through hole 2HB symmetrically with respect to the linear conductor of the X-axis direction loop coil 21B. Therefore, the area of each of the bypass portion 21B1a and the bypass portion 21B2a projecting to the left and right with respect to the linear conductor of the X-axis direction loop coil 21B is substantially equal to the area of the region of the half circle of the through hole 2HB. Furthermore, the bypass portion 21B1a increases the area of the first turn 21B1, and the bypass portion 21B2a decreases the area of the second turn 21B2, thereby canceling the increase or decrease of the area with each other.

As described above, in the embodiment, the electromotive force generated by the electromagnetic induction based on the electromagnetic energy from the electronic pen 3 is as indicated by a curved line E0 of FIG. 7B in the region outside of the surrounding region of the through hole 2HB (corresponding to the region of the correction necessary range) in the X-axis direction loop coil 21B with two turns that intersects the through hole 2HB and that includes the bypass portion 21B1a and the bypass portion 21B2a.

Furthermore, as for the electromotive force generated by the electromagnetic induction based on the electromagnetic energy from the electronic pen 3 in the correction necessary range, the electromotive force generated by the electromagnetic induction in the first turn 21B1 including the bypass portion 21B1a of the X-axis direction loop coil 21B with two turns is as indicated by a curved line E1 in FIG. 7C, and the electromotive force generated by the electromagnetic induction in the second turn 21B2 including the bypass portion 21B2a is as indicated by a curved line E2 in FIG. 7C.

Therefore, the electromotive force generated by the electromagnetic induction in the X-axis direction loop coil 21B including the first turn 21B1 and the second turn 21B2 and intersecting the through hole 2HB is electromotive force indicated by a dashed line E3 that is a composite of the electromotive force indicated by the curved line E1 and the electromotive force indicated by the curved line E2 in FIG. 7C. This electromotive force is substantially equal to the electromotive force indicated by the curved line E0 (FIG. 7B) generated by the electromagnetic induction in the X-axis direction loop coil 21B with two turns in the region outside of the surrounding region of the through hole 2HB (corresponding to the region of the correction necessary range) illustrated in FIG. 7B.

Therefore, when the X-axis direction loop coil 21B with two turns intersects the through hole 2HB in the state as illustrated in FIG. 7A, the correction using the first table information is not necessary for the electromotive force induced in the X-axis direction loop coil 21B.

However, when the X-axis direction loop coil 21B intersects the through hole 2HB at a position deviated from the extension direction of the linear conductor that crosses the center position of the circular through hole 2HB, a difference may be created between the area of the projection portion of the bypass portion 21B1a and the area of the projection portion of the bypass portion 21B2a. In that case, it is preferable to use the first table information to correct the electromotive force induced in the X-axis direction loop coil 21B.

The illustration and the description apply similarly to the Y-axis direction loop coil 22B, and are therefore omitted.

Note that, when the loop coil with two turns intersects the center of the through hole, by making the first turn and the second turn of the loop coil project in two different directions at the bypass portions bypassing the through hole, a large canceling effect on the area increase and decrease of the projection portions can be obtained. When the loop coil intersects the through hole near the edge of the shape of the through hole, variation in the area of the loop coil not intersecting the through hole can be reduced by arranging the loop coil to bypass the through hole by taking the shortest route along the shape of the through hole as in the first or second embodiment.

For example, the X-axis direction loop coils 21B with two turns may be arranged at the arrangement pitch τx, and as illustrated in FIG. 7D, three X-axis direction loop coils 21B (distinguished as 211B, 212B, and 213B in FIG. 7D) may intersect the through hole 2HB in a case described further below.

In the example of FIG. 7D, the X-axis direction loop coil 212B at the center among the three X-axis direction loop coils 211B, 212B, and 213B intersecting the through hole 2HB is in a state in which the extension direction of the linear conductor of the X-axis direction loop coil 212B crosses the center position of the circular through hole 2HB. Furthermore, the other X-axis direction loop coils 211B and 213B are in a state in which the extension directions of the linear conductors of the X-axis direction loop coils 211B and 213B do not cross the center position of the circular through hole 2HB. The X-axis direction loop coils 211B and 213B are arranged at positions, where variation in the loop coil area between the X-axis direction loop coils 211B and 213B intersecting the through hole 2HB and the X-axis direction loop coils 211B and 213B not intersecting the through hole 2HB is smaller when the bypass portions take the shortest routes along the shape of the through hole 2HB, than variation in the loop coil area of the X-axis direction loop coils 211B and 213B when the projection directions of the bypass portions bypassing the through hole 2HB are different between the first turns and the second turns of the X-axis direction loop coils 211B and 213B having two turns.

Considering the fact that the three X-axis direction loop coils 211B, 212B, and 213B intersect the through hole 2HB in the positional relationships described above, a bypass portion 212B1a is formed and arranged so that a first turn 212B1 of the central X-axis direction loop coil 212B projects to the left side, and a bypass portion 212B2a is formed and arranged so that a second turn 212B2 projects to the right side in the example of FIG. 7D. The projection directions of the bypass portions bypassing the through hole 2HB are different.

Furthermore, in the example of FIG. 7D, bypass portions 211B1a and 211B2a bypassing the through hole 2HB on the left side by taking the shortest routes along the circular shape of the through hole are formed and arranged on a first turn 211B1 and a second turn 211B2 of the X-axis direction loop coil 211B on the left side. Furthermore, in the example of FIG. 7D, bypass portions 213B1a and 213B2a bypassing the through hole 2HB on the right side by taking the shortest routes along the circular shape of the through hole are formed and arranged on a first turn 213B1 and a second turn 213B2 of the X-axis direction loop coil 213B on the right side.

Note that, obviously, the first turn 211B1 and the second turn 211B2 of the X-axis direction loop coil 211B and the first turn 213B1 and the second turn 213B2 of the X-axis direction loop coil 213B may be provided with opposite projection portions that cancel the change in the area of the bypass portions that are projection portions, as in the second embodiment.

In the position detection circuit corresponding to the position detection sensor 2B of the example of FIG. 7D, the second table information is not necessary (though the second table information may be provided) for the central X-axis direction loop coil 212B among the three X-axis direction loop coils 211B, 212B, and 213B intersecting the through hole 2HB, and the second table information may be prepared for the X-axis direction loop coils 211B and 213B that are not central, to correct for the electromotive force.

Note that, although the through hole 2HB is circular in the example of FIG. 7, the shape of the through hole 2HB formed in the position detection sensor 2B of the third embodiment may be any shape. However, when the shape of the through hole 2HB is a shape having a line-symmetric axis, where the extension directions of the linear conductors of the loop coil overlap the line-symmetric axis of the through hole 2HB, it is possible to take advantage of that the areas of the projection portions formed by the bypass portions projecting in different directions, such as the left and right directions or the up and down directions, can be made equal to each other. However, the shape of the through hole 2HB may be any shape without a line-symmetric axis as long as the increase and decrease in the area can be canceled by making the projection directions different from each other, as between the left and right directions (in the array pitch direction of X-axis direction loop coils) or the up and down directions (in the array pitch direction of Y-axis direction loop coils).

Note that, in a case where a plurality of loop coils intersect the through hole 2HB as in the example of FIG. 7D, when the bypass portion is formed on the first turn to increase the area and the bypass portion is formed on the second turn to decrease the area in each of the plurality of loop coils as illustrated in FIG. 7A, if the bypass portions are to be formed on the same surface of the insulating substrate, part of the bypass portions may intersect each other. Therefore, to prevent the bypass portions from intersecting each other, through holes may be arranged at the bypass portions to support providing the conductors on both the front surface and the back surface of the insulating substrate.

Although the example of FIG. 7 described above illustrates the case of the loop coil having two turns, it is obvious that the number of turns of the loop coil formed on the position detection sensor 2B of the third embodiment may be two or more as long as the number is an even number that can be divided by 2 so that the projection directions can be made different in the left and right directions (in the array pitch direction of X-axis direction loop coils) or the up and down directions (in the array pitch direction of Y-axis direction loop coils).

Note that, as described in the first embodiment, the first table information may be generated and stored, and the position may be detected when the position indicated by the electronic pen is in the region of the through hole 2HB, in the third embodiment also.

Fourth Embodiment of Position Detection Sensor

A fourth embodiment is an example in which the loop coil intersecting the through hole 2H of the position detection sensor 2 is configured so as to minimize the change in the area caused by the bypass portions of the through hole 2H, to thus minimize the correction based on the second table information, thereby further improving the accuracy of position detection.

In the position detection sensor of the example, the X-axis direction loop coils and the Y-axis direction loop coils are provided by arranging the linear conductors of a predetermined width in a rectangular shape on the insulating substrate as described above. In this example, the conductors included in the loop coils have a predetermined width, and an area corresponding to the width becomes necessary to bypass the through hole. Particularly when the loop coils have multiple turns, they are arranged close to each other at the bypass portions while maintaining electrical insulation from each other. However, the larger the width of the conductors, the greater the area change caused by the bypass portions.

In view of this, the width of the conductor at the bypass area of the through hole in the loop coil intersecting the through hole is made smaller than the width of the conductor at other portions, to thereby reduce the area change caused by the bypass portions as much as possible in the fourth embodiment.

Figure 8:
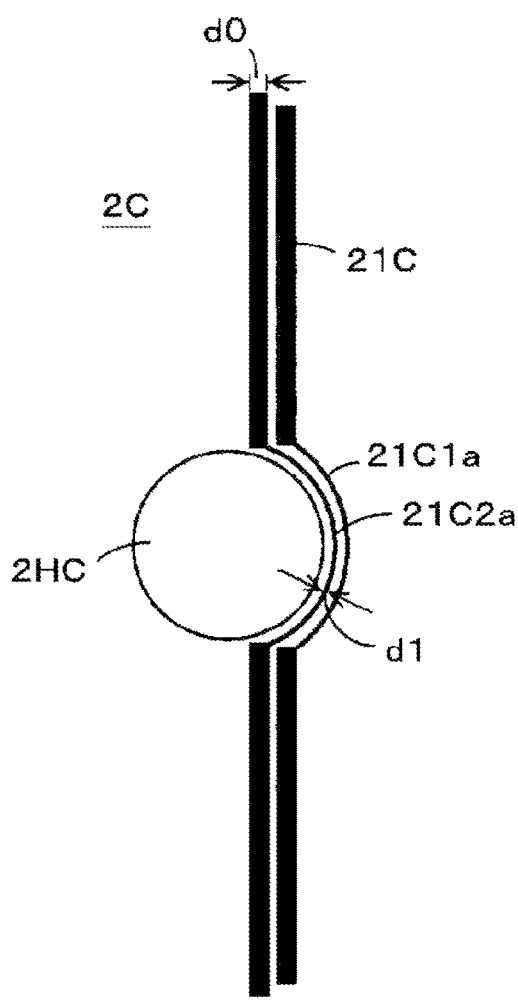
FIG. 8 is a diagram for describing main parts of a fourth embodiment of the position detection sensor according to the invention.

FIG. 8 is a diagram for describing the bypass portion formed on an X-axis direction loop coil 21C intersecting a through hole 2HC formed in the effective region of the insulating substrate of a position detection sensor 2C according to the fourth embodiment. In the example, the X-axis direction loop coil 21C is a loop coil having two turns and includes a first turn 21C1 and a second turn 21C2. In addition, the through hole 2HC has a circular shape as in the third embodiment. Note that the shape of the through hole 2HC is not limited to the circular shape, and the shape may be any shape as in the example described above.

As illustrated in FIG. 8, bypass portions 21C1a and 21C2a bypassing the through hole 2HC by taking the shortest routes are formed on the first turn 21C1 and the second turn 21C2 of the X-axis direction loop coil 21C in the fourth embodiment. Furthermore, in the embodiment, the width of the conductor at the first turn 21C1 and the second turn 21C2 of the X-axis direction loop coil 21C at portions excluding the bypass portions 21C1a and 21C2a is a predetermined width d0. The width of the conductor at the bypass portions 21C1a and 21C2a is smaller than the width d0 and is a minimum width for forming the X-axis direction loop coil 21C, d1 (<d0).

As a result, the bypass portions 21C1a and 21C2a can be positioned close to the periphery of the through hole 2HC compared to the case in which the width d0 is used to form the conductor of the X-axis direction loop coil 21C. This reduces the projection span of the bypass portions 21C1a and 21C2a and reduces the area of the projection portions. Therefore, the difference in area between the loop coil intersecting the through hole 2HC and the loop coil not intersecting the through hole 2HC can be reduced, and the correction values based on the second table information can be reduced. This provides an advantageous effect of further suppressing the degradation in position detection accuracy.

Note that the second embodiment and the third embodiment can also be applied to the position detection sensor 2C of the fourth embodiment. That is, when the second embodiment is applied to the fourth embodiment, the width of the conductor is reduced at the opposite projection portions and the bypass portions, or the width of the conductor is reduced at the bypass portions while the width of the conductor is not reduced at the opposite projection portions. In addition, when the third embodiment is applied to the fourth embodiment, if the loop coil has two turns, the width of the conductor is reduced at the bypass portion of the first turn and at the bypass portion of the second turn.

Note that the examples of the loop coil having a plurality of turns have been described because they more particularly enjoy the advantageous effect of the example of FIG. 8. It is obvious that the advantageous effect of reducing the size of the change in area can also be obtained with respect to the loop coil having one turn.

Note that, in the fourth embodiment, the first table information may be generated and stored, and the position may be detected when the position indicated by the electronic pen is in the region of the through hole 2HC as described in the first embodiment.

Other Embodiments and Variations

First Table Information and Second Table Information for Correcting Position Detection The first table information and the second table information stored in the first table memory and the second table memory provided in the position detection circuitry according to the first to fourth embodiments are generally formed by assuming that the electronic pen 3 is perpendicular to the input surface of the position detection sensor (the upper surface of the surface panel 13).

Figure 9A:
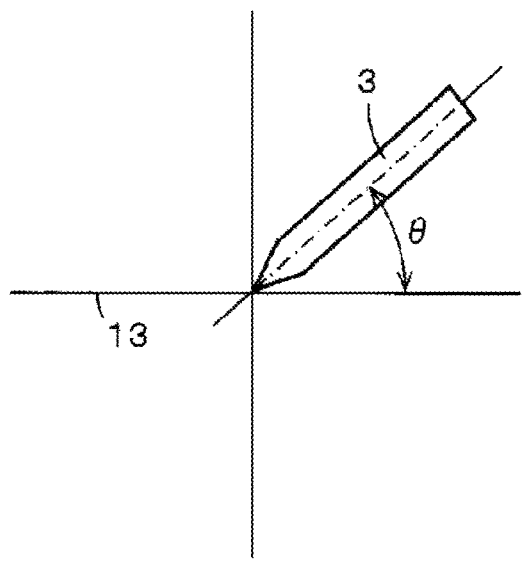
FIGS. 9A and 9B are diagrams for describing main parts of an embodiment of the position detection circuit connected to an embodiment of the position detection sensor according to the invention.

However, in normal usage, the electronic pen 3 is used in a state in which the electronic pen 3 is titled at a predetermined tilt angle $\theta$ with respect to the input surface of the position detection sensor (the front surface of the surface panel 13) as illustrated in FIG. 9A. Furthermore, in the tilted use state, depending on the tilt direction of the electronic pen 3, a different loop coil of the position detection sensor uses the output signal for detecting the indicated position of the electronic pen 3.

Therefore, the accuracy of position detection may be improved by providing the first table information and the second table information according to the tilt angle $\theta$ of the electronic pen 3 and a tilt direction $\varphi$ of the electronic pen 3, respectively. For example, a plurality of predetermined tilt angles $\theta$ of the electronic pen 3 and a plurality of tilt directions $\varphi$ may be set, and the first table information and the second table information for of the each tilt angles $\theta$ and each of the tilt directions $\varphi$ may be generated. The first table information and the second table information are stored in the first table memory and the second table memory in association with the tilt angles $\theta$ and the tilt directions $\varphi$.

Figure 9B:
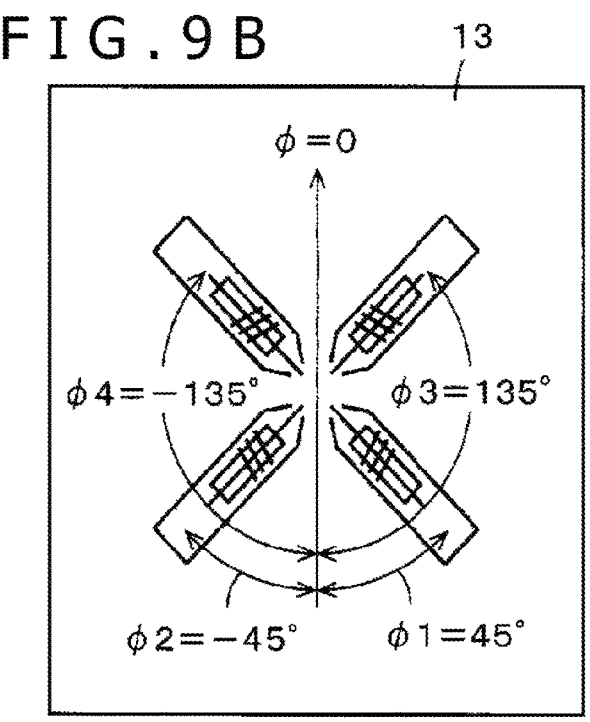

FIG. 9B is a diagram illustrating a case of four tilt directions as a plurality of tilt directions $\varphi$ at one tilt angle $\theta1$. That is, as indicated by an arrow in FIG. 9B, the direction from bottom to top in the input surface of the position detection sensor (the front surface of the surface panel 13) is set as a direction of 0 degrees. Furthermore, an angle deviated to the right side with respect to the direction of 0 degrees is set as a "+" angle, and an angle deviated to the left side is set as a "−" angle. As illustrated in FIG. 9B, four directions are set in the example including $\varphi1=+45$ degrees, $\varphi2=-45$ degrees, $\varphi3=+135$ degrees, and $\varphi4=-135$ degrees. Furthermore, the first table information and the second table information at each of the tilt direction angles $\varphi1$, $\varphi2$, $\varphi3$, and $\varphi4$ are generated and stored in the first table memory and the second table memory in association with the tilt angle $\theta1$.

Furthermore, a plurality of tilt angles $\theta$, such as $\theta1$, $\theta2$, $\theta3$ ..., of the electronic pen 3 may also be set, and the first table information and the second table information at each of the tilt direction angles $\varphi1$, $\varphi2$, $\varphi3$, and $\varphi4$ are generated in the state of each of the tilt angles $\theta1$, $\theta2$, $\theta3$ ..., and stored in the first table memory and the second table memory in association with the tilt angles $\theta1$, $\theta2$, $\theta3$ .... Note that the tilt direction angles $\varphi1$, $\varphi2$, $\varphi3$, and $\varphi4$ do not have to be taken into account in a case of tilt angle $\theta=90$ degrees, where only one piece of the first table information and the second table information is necessary, and the first table information and the second table information need not be prepared for each of the tilt direction angles $\varphi1$, $\varphi2$, $\varphi3$, and $\varphi4$, respectively.

Meanwhile, means for detecting the tilt angle $\theta$ and the tilt direction $\varphi$ may be provided on the electronic pen 3, and a detection function of the tilt angle $\theta$ and the tilt direction $\varphi$ of the electronic pen 3 may be provided on the position detection circuit. Well-known techniques can be used for the means of the electronic pen 3 for detecting the tilt angle $\theta$ and the tilt direction $\varphi$ and for the detection function of the position detection circuit to detect the tilt angle $\theta$ and the tilt direction $\varphi$ of the electronic pen 3, and the description of the configurations of the means is omitted here.

Furthermore, in the actual use, the position detection circuit detects the tilt angle $\theta$ and the tilt direction $\varphi$ of the electronic pen 3 and uses the first table information and the second table information corresponding to the detected tilt angle $\theta$ and tilt direction $\varphi$ to execute the correction process. In this case, when the tilt angle $\theta$ and the tilt direction $\varphi$ of the electronic pen 3 detected by the position detection circuit include an intermediate angle of the angles for which the first table information and the second table information are prepared, the first table information and the second table information of the two angles having the detected angle in the middle can be interpolated according to the detected angle to achieve the correction.

Case Example of Electrostatic Coupling System

Although the embodiments described above illustrate the cases of the electronic pen, the position detection sensor, and the position detection circuit of the electromagnetic induction system, the invention is not limited to application in the electromagnetic induction system, and the invention can also be applied in cases of the electronic pen, the position detection sensor, and the position detection circuit of the electrostatic coupling system.

FIG. 10 is a diagram for describing a configuration example of an electronic pen 3D, a position detection sensor 2D, and a position detection circuit 100D of the electrostatic coupling system.

The electronic pen 3D includes a signal transmission circuit 30S that transmits a predetermined signal and includes a conductive central rod 34. The signal from the signal transmission circuit 30S is supplied from the central rod 34 to the position detection sensor 2D through electrostatic coupling.

The position detection sensor 2D in the example includes a first conductor group 24 formed on the back side of an insulating substrate 20D including a through hole 2HD, and includes a second conductor group 25 formed on the front surface side. The through hole 2HD is provided in the effective position detection region formed by the first conductor group 24 and the second conductor group 25. Note that the first conductor group 24 includes, for example, a plurality of first linear conductors $24Y_1, 24Y_2, \ldots,$ and $24Y_m$ (m is an integer equal to or greater than 1) extending in the horizontal direction (X-axis direction) and arranged in parallel at predetermined intervals in the vertical direction (Y-axis direction). Furthermore, the first linear conductor 24Y intersecting the through hole 2HD is configured to include a bypass portion bypassing the through hole 2HD based on one or a combination of the first to fourth embodiments.

In addition, the second conductor group 25 includes a plurality of second linear conductors $25X_1, 25X_2, \ldots,$ and $25X_n$ (n is an integer equal to or greater than 1) extending in a direction intersecting the extension direction of the first linear conductors $24Y_1, 24Y_2, \ldots,$ and $24Y_m$, which is the orthogonal vertical direction (Y-axis direction) in the example, and arranged in parallel at predetermined intervals in the X-axis direction. Furthermore, the second linear conductor 25X intersecting the through hole 2HD is configured to include a bypass portion bypassing the through hole 2HD based on one or a combination of the first to fourth embodiments.

The position detection sensor 2D of the example includes, on a display screen of a display apparatus such as an LCD of an electronic device, an effective region as an indication input surface in a size corresponding to the size of the display region of the display screen, and the first conductor group 211 and the second conductor group 212 are configured to have light transmissivity. Note that the first linear conductors 24Y and the second linear conductors 25X form position detection electrodes.

Note that the first conductor group 24 and the second conductor group 25 may be arranged on the same surface side of the insulating substrate 20D.

The position detection circuit 100D includes a selection circuit 121, which serves as an input-output interface for the position detection sensor 2D, an amplification circuit 122, a band-pass filter 123, a detection circuit 124, a sample hold circuit 125, an AD (Analog to Digital) conversion circuit 126, and a processing control unit 130.

The selection circuit 121 selects one conductor from the first conductor group 24 and one conductor from the second conductor group 25 based on a control signal from the processing control unit 130. The conductors selected by the selection circuit 121 are connected to the amplification circuit 122, and the signal from the electronic pen 3D is detected by the selected conductors and amplified by the amplification circuit 122. The output of the amplification circuit 122 is supplied to the band-pass filter 123, and only the frequency components of the signal transmitted from the electronic pen 3D are extracted.

The output signal of the band-pass filter 123 is detected by the detection circuit 124. The output signal of the detection circuit 124 is supplied to the sample hold circuit 125, and a sampling signal from the processing control unit 130 is used to sample and hold the output signal at predetermined timing. The output signal is then converted into a digital value by the AD conversion circuit 126 and supplied to the processing control unit 130.

The processing control unit 130 transmits control signals to the sample hold circuit 125, the AD conversion circuit 126, and the selection circuit 121 and uses digital data from an AD conversion circuit 226 to calculate position coordinates on the position detection sensor 2D indicated by the electronic pen 3D. The processing control unit 130 outputs the data of the position coordinates to, for example, other processing processors and the like.

Furthermore, the processing control unit 130 in the example also includes a correction circuit 131 that corrects the output from the first linear conductor 24Y and the second linear conductor 25X intersecting the through hole 2HD and that executes a process of detecting the indicated position when position indicated by the electronic pen 3D is in the region of the through hole 2HD. Furthermore, the processing control unit 130 includes a first table memory 132 storing first table information, for the correction circuit 131 to detect the indicated position in the region of the through hole 2HD, and a second table memory 133 storing second table information, for the correction circuit 131 to execute the correction process on the output from the first linear conductor 24Y and the second linear conductor 25X intersecting the through hole 2HD.

According to the configuration, just like the processing control unit 110 according to the first to fourth embodiments, when the position detection sensor 2D in the example of FIG. 10 including the through hole 2HD is used, the processing control unit 130 can also detect, without obstruction, the indicated position of the electronic pen 3D in the effective region including the through hole 2HD.

Another Modification

Note that, although the position detection electrodes are formed by linear conductors in the cases described in the embodiments, the invention can also be applied to a case in which, for example, the insulating substrate is circular or elliptical, the position detection electrodes are formed in curved shapes, and the through hole is formed in the effective region of the circular or elliptical insulating substrate.

DESCRIPTION OF REFERENCE SYMBOLS

1: Electronic device
2, 2A, 2B, 2C, 2D: Position detection sensor 2H, 2HB, 2HC, 2HD: Through hole
3, 3D: Electronic pen
23: Through hole
21a, 22a: Bypass portion

The invention claimed is:

1. An electronic device, comprising:
a position detection sensor including a plurality of position detection electrodes arranged on an insulating substrate, wherein a region provided with the plurality of position detection electrodes forms an effective detection region for detecting an indicated position of a position indicator, wherein
a through hole having a predetermined shape is formed in the insulating substrate in the effective detection region, and
the position detection electrodes are arranged to bypass the through hole along the shape of the through hole at an area intersecting the through hole; and
a position detection circuit that detects a position indicated by the position indicator on the position detection sensor based on signals from the plurality of position detection electrodes of the position detection sensor, wherein
the position detection circuit includes a position correction circuit that calculates coordinate values of a first position in the through hole, the position detection electrodes not being present at the first position, as indicated by the position indicator.

2. The electronic device according to claim 1, wherein the plurality of position detection electrodes are arranged in a predetermined direction at a predetermined array pitch, and
a size of the through hole is greater than the predetermined array pitch.

3. The electronic device according to claim 1, wherein a portion of the position detection electrode bypassing the through hole is configured to take the shortest bypass route.

4. The electronic device according to claim 2, wherein the plurality of the position detection electrodes adjacent to each other at portions bypassing the through hole by taking similar bypass routes are arranged close to each other, regardless of the array pitch.

5. The electronic device according to claim 1, wherein the position detection sensor detects a coordinate position in a first direction and a coordinate position in a second direction orthogonal to the first direction in the effective region,
the position detection electrodes include a plurality of first direction electrodes arranged in the second direction and configured to detect the coordinate position in the first direction and a plurality of second direction electrodes arranged in the first direction and configured to detect the coordinate position in the second direction, and
the first direction electrodes and the second direction electrodes are formed by arranging conductors on both surfaces of the insulating substrate.

6. The electronic device according to claim 1, wherein each of the plurality of position detection electrodes is a loop coil.

7. The electronic device according to claim 6, wherein the position detection electrode intersecting the through hole is formed by deforming a shape of the electrode conductor around the through hole so as to compensate for an increase or decrease in an area surrounded by the loop coil caused by the electrode conductor bypassing the through hole.

8. The electronic device according to claim 6, wherein the position detection electrode intersecting the through hole is deformed at portions just before and/or after the position detection electrode intersects the through hole, so as to reduce a change in an area surrounded by the loop coil due to deformation of the electrode conductor bypassing the through hole.

9. The electronic device according to claim 1, wherein the position detection electrode includes the electrode conductor in a linear shape that is arranged to bypass the through hole to form a projection portion with respect to the linear shape.

10. The electronic device according to claim 1, wherein the position detection electrodes are loop coils having an even number of turns, and a bypassing direction along the shape of the through hole of one half of the even number of turns is different from a bypassing direction along the shape of the through hole of another half of the even number of turns.

11. The electronic device according to claim 7, wherein, in the position detection electrodes, a line width of the electrode conductor at a portion bypassing the through hole along the shape of the through hole is thinner than a line width of other portions.

12. The electronic device according to claim 1, wherein the position detection electrodes are linear electrodes, and the plurality of the position detection electrodes are arrayed in a direction intersecting the linear electrodes.

13. The electronic device according to claim 1, wherein the position correction circuit corrects the signals from those position detection electrodes arranged to bypass the through hole.

14. The electronic device according to claim 1, wherein the position correction circuit calculates coordinate values of a second position near the through hole, the position detection electrodes being present at the second position, as indicated by the position indicator.

15. An electronic device comprising:
a position detection sensor arranged in a housing;
an operation input surface of the position detection sensor provided on an upper side of the position detection sensor; and
a predetermined component arranged on a lower side of the position detection sensor, wherein
the position detection sensor includes a plurality of position detection electrodes arranged on an insulating substrate, wherein a region provided with the plurality of position detection electrodes forms an effective detection region for detecting an input indication on the operation input surface for detecting a position of a position indicator,
a through hole having a predetermined shape that corresponds to the predetermined component is formed in the insulating substrate at a position corresponding to a position of the predetermined component in the effective detection region,
the position detection electrodes are arranged to bypass the through hole along the shape of the through hole at an area intersecting the through hole, and
a position detection circuit that detects a position indicated by the position indicator on the position detection sensor based on signals from the plurality of position detection electrodes of the position detection sensor, wherein
the position detection circuit includes a position correction circuit that calculates coordinate values of a first position in the through hole, the position detection electrodes not being present at the first position, as indicated by the position indicator.

16. The electronic device according to claim 15, wherein
the position correction circuit corrects the signals from those position detection electrodes arranged to bypass the through hole.

17. The electronic device according to claim 15, wherein
the position correction circuit calculates coordinate values of a second position near the through hole, the position detection electrodes being present at the second position, as indicated by the position indicator.

\* \* \* \* \*